US011422503B2

(12) United States Patent
Ozcan et al.

(10) Patent No.: US 11,422,503 B2
(45) Date of Patent: Aug. 23, 2022

(54) DEVICE AND METHOD FOR ITERATIVE PHASE RECOVERY BASED ON PIXEL SUPER-RESOLVED ON-CHIP HOLOGRAPHY

(71) Applicant: THE REGENTS OF THE UNIVERSITY OF CALIFORNIA, Oakland, CA (US)

(72) Inventors: Aydogan Ozcan, Los Angeles, CA (US); Alon Grinbaum, Durham, NC (US); Yibo Zhang, Los Angeles, CA (US); Alborz Feizi, Chino, CA (US); Wei Luo, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/952,492

(22) Filed: Nov. 19, 2020

(65) Prior Publication Data

US 2021/0181673 A1 Jun. 17, 2021

Related U.S. Application Data

(62) Division of application No. 15/500,880, filed as application No. PCT/US2015/043266 on Jul. 31, 2015, now Pat. No. 10,871,745.

(Continued)

(51) Int. Cl.
*G03H 1/00* (2006.01)
*G03H 1/04* (2006.01)
(Continued)

(52) U.S. Cl.
CPC ....... *G03H 1/0005* (2013.01); *G01N 15/1429* (2013.01); *G01N 15/1434* (2013.01);
(Continued)

(58) Field of Classification Search
CPC .. G03H 1/0443; G03H 2001/005; G03H 1/06; G03H 2001/0452; G03H 2001/0816;
(Continued)

(56) References Cited

U.S. PATENT DOCUMENTS 6,344,909 B1 2/2002 Grossetie
7,277,209 B1 10/2007 Grossetie
(Continued)

FOREIGN PATENT DOCUMENTS

WO  WO-2012094523 A2 * 7/2012 ......... G01B 9/02041
WO  2013/070287       5/2013

OTHER PUBLICATIONS

Mudanyali et al. "Compact, light-weight and cost-effective microscope based on lensless incoherent holography for telemedicine applications," Lab on a Chip; Apr. 19, 2010; pp. 1417-1428 (Year: 2010).*

(Continued)

*Primary Examiner* — Daniel Chang
(74) *Attorney, Agent, or Firm* — Vista IP Law Group LLP

(57) ABSTRACT

A method for lens-free imaging of a sample or objects within the sample uses multi-height iterative phase retrieval and rotational field transformations to perform wide FOV imaging of pathology samples with clinically comparable image quality to a benchtop lens-based microscope. The solution of the transport-of-intensity (TIE) equation is used as an initial guess in the phase recovery process to speed the image recovery process. The holographically reconstructed image can be digitally focused at any depth within the object FOV (after image capture) without the need for any focus adjustment, and is also digitally corrected for artifacts arising from uncontrolled tilting and height variations between the sample and sensor planes. In an alternative embodiment, a synthetic aperture approach is used with multi-angle itera- (Continued)

tive phase retrieval to perform wide FOV imaging of pathology samples and increase the effective numerical aperture of the image.

17 Claims, 24 Drawing Sheets

Related U.S. Application Data

(60) Provisional application No. 62/032,418, filed on Aug. 1, 2014.

(51) Int. Cl.

| | |
|---|---|
| G01N 15/14 | (2006.01) |
| G03H 1/08 | (2006.01) |
| H04N 5/225 | (2006.01) |
| H04N 5/232 | (2006.01) |
| G01N 15/10 | (2006.01) |
| G03H 1/26 | (2006.01) |

(52) U.S. Cl.
CPC ....... *G01N 15/1475* (2013.01); *G03H 1/0443* (2013.01); *G03H 1/0866* (2013.01); *G03H 1/0891* (2013.01); *H04N 5/2256* (2013.01); *H04N 5/23238* (2013.01); *G01N 2015/1006* (2013.01); *G01N 2015/144* (2013.01); *G01N 2015/1445* (2013.01); *G01N 2015/1454* (2013.01); *G03H 2001/005* (2013.01); *G03H 2001/046* (2013.01); *G03H 2001/0447* (2013.01); *G03H 2001/0454* (2013.01); *G03H 2001/0816* (2013.01); *G03H 2001/0883* (2013.01); *G03H 2001/2655* (2013.01); *G03H 2210/42* (2013.01); *G03H 2226/02* (2013.01); *G03H 2227/03* (2013.01)

(58) Field of Classification Search
CPC ... G03H 2001/0212; G03H 2001/0875; G02B 21/00; G02B 21/0008; G02B 21/002; G01N 15/0227; G01N 2015/0065; G01N 2015/0233; G01Q 60/24; G01Q 60/32; G01Q 60/36; G01Q 60/363; G01Q 90/00
See application file for complete search history.

(56) References Cited

U.S. PATENT DOCUMENTS

| | | | |
|---|---|---|---|
| 2002/0060831 A1* | 5/2002 | Gerchberg | G02B 27/46 359/237 |
| 2003/0202634 A1 | 10/2003 | Gerchberg | |
| 2010/0135573 A1 | 6/2010 | Xu et al. | |
| 2010/0201784 A1* | 8/2010 | Lippert | G02B 21/244 348/46 |
| 2012/0148141 A1 | 6/2012 | Ozcan et al. | |
| 2012/0157160 A1 | 6/2012 | Ozcan et al. | |
| 2012/0218379 A1 | 8/2012 | Ozcan et al. | |
| 2012/0248292 A1 | 10/2012 | Ozcan et al. | |
| 2013/0092821 A1 | 4/2013 | Ozcan et al. | |
| 2013/0148182 A1 | 6/2013 | Yu | |
| 2013/0157351 A1 | 6/2013 | Ozcan et al. | |
| 2013/0193544 A1 | 8/2013 | Ozcan | |
| 2013/0203043 A1 | 8/2013 | Ozcan et al. | |
| 2013/0258091 A1 | 10/2013 | Ozcan et al. | |
| 2013/0280752 A1 | 10/2013 | Ozcan et al. | |
| 2013/0281899 A1 | 10/2013 | Suarez et al. | |
| 2014/0120563 A1 | 5/2014 | Ozcan et al. | |
| 2014/0160236 A1 | 6/2014 | Ozcan et al. | |
| 2014/0300696 A1 | 10/2014 | Ozcan et al. | |
| 2015/0056607 A1 | 2/2015 | Jooris | |
| 2015/0111201 A1 | 4/2015 | Ozcan et al. | |
| 2015/0153558 A1 | 6/2015 | Ozcan et al. | |
| 2015/0204773 A1 | 7/2015 | Ozcan et al. | |
| 2016/0070092 A1 | 3/2016 | Ozcan et al. | |
| 2016/0161409 A1 | 6/2016 | Ozcan et al. | |
| 2016/0327473 A1 | 11/2016 | Ozcan et al. | |
| 2016/0334614 A1 | 11/2016 | Ozcan et al. | |

OTHER PUBLICATIONS

Bernet et al. "Lensless digital holography with diffuse illumination through a pseudo-random phase mask," Optical Express, OSA, vol. 19 No. 25, 2011 (Year: 2010).*

Su et al. "Multi-angle lensless digital holography for depth resolved imaging on a chip" Optics Express, OSA, vol. 18 No. 9, Apr. 2010 (Year: 2010).*

PCT International Search Report for PCT/US2015/043266, Applicant: The Regents of the University of California, Form PCT/ISA/ 210 and 220, dated Feb. 16, 2016 (4pages).

PCT Written Opinion of the International Search Authority for PCT/US2015/043266, Applicant: The Regents of the University of California, Form PCT/ISA/237, dated Feb. 16, 2016 (8pages).

Greenbaum, Alon et al., Wide-field computational color imaging using pixel super-resolved on-chip microscopy, May 20, 2013, vol. 21, No. 10, DOI:10.1364/OE.21.012469, Optics Express 12469-12483.

Greenbaum, Alon et al., Maskless imaging of dense samples using pixel super-resolution based multi-height lensfree on-chip microscopy, Jan. 30, 2012, vol. 20, No. 3, Optics Express, 3129-3143.

Greenbaum, Alon et al., Field-Portable Pixel Super-Resolution Colour Microscope, PLOS One, www.plosone.org, Sep. 2013, vol. 8, Issue 9, e76475 (9pages).

Su, Ting-Wei et al., Multi-angle lensless digital holography for depth resolved imaging on a chip, Opt Express. Apr. 26, 2010; 18(9):9690-9711.

Bishara, Waheb et al., Holographic pixel super-resolution in portable lensless on-chip microscopy using a fiber-optic array, Lab Chip 11, 1276-1279 (2011).

Bishara, Waheb et al., Lensfree on-chip microscopy over a wide field-of-view using pixel super-resolution, Optics Express 18:11181-11191 (2010).

Hardie, Russell et al., High Resolution Image Reconstruction From a Sequence of Rotated and Translated Frames and its Application to an Infrared Imaging System, Opt. Eng. 37(1), 247-260 (1998).

Isikman, Serhan et al., Lens-free Cell Holography on a Chip: From Holographic Cell Signatures to Microscopic Reconstruction, Proceedings of IEEE Photonics Society Annual Fall Meeting, pp. 404-405 (2009).

Oh, Chulwoo et al., On-Chip differential interference contrast microscopy using lensless digital holography, Opt Express.;18(5):4717-4726 (2010).

PCT International Preliminary Report on Patentability (Chapter I of the Patent Cooperation Treaty) for PCT/US2015/043266, Applicant: The Regents of the University of California, Form PCT/IB/326 and 373, dated Feb. 16, 2017 (10 pages).

The extended European search report dated Feb. 23, 2018 for European Patent Application No. 15827025.6-1210 / 3175302, Applicant: The Regents of the University of California (11pages).

Communication pursuant to Rules 70(2) and 70a(2) EPC dated Mar. 13, 2018 for European Patent Application No. 15827025.6-1210 / 3175302, Applicant: The Regents of the University of California (1page).

Allen, L.J. et al., Phase retrieval from series of images obtained by defocus variation, Optics Communications 199 (2001) 65-75.

De Nicola, S. et al., Angular spectrum method with correction of anamorphism for numerical reconstruction of digital holograms on tilted planes, Optics Express, vol. 13, No. 24, Nov. 28, 2005, 9935-9940.

Greenbaum, Alon et al., Field-portable wide-field microscopy of dense samples using multi-height pixel super-resolution based lensfree imaging, Lab Chip, 2012, 12, 1242.

Greenbaum, Alon et al., Maskless imaging of dense samples using pixel super-resolution based multi-height lensfree on-chip microscopy, Optic Express, vol. 20, No. 3, Jan. 30, 2012, 3129-3141.

(56) References Cited

OTHER PUBLICATIONS

Response to extended European search report pursuant to Rules 70(2) and 70a(2) EP dated Sep. 24, 2018 for European Patent Application No. 15827025.6-1210 / 3175302, Applicant: The Regents of the University of California (23pages).
Decision to grant a European patent pursuant to Article 97(1) EPC dated Dec. 2, 2021 for European Patent Application No. 15827025.6-1211/ 3175302, (2 pages).

* cited by examiner

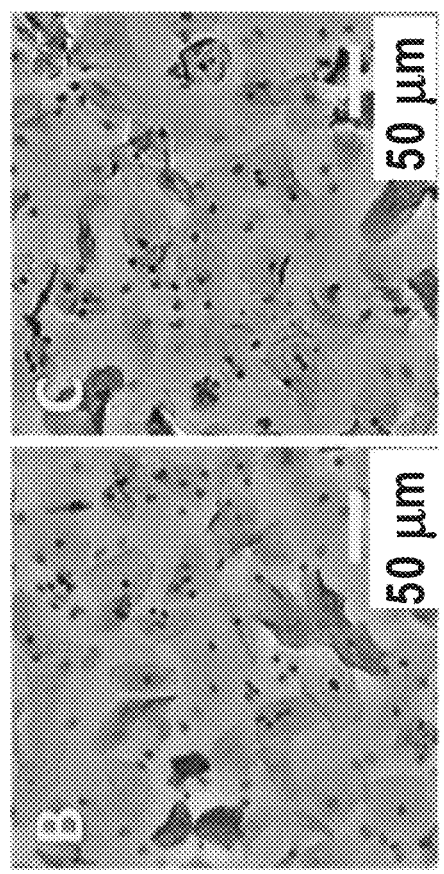
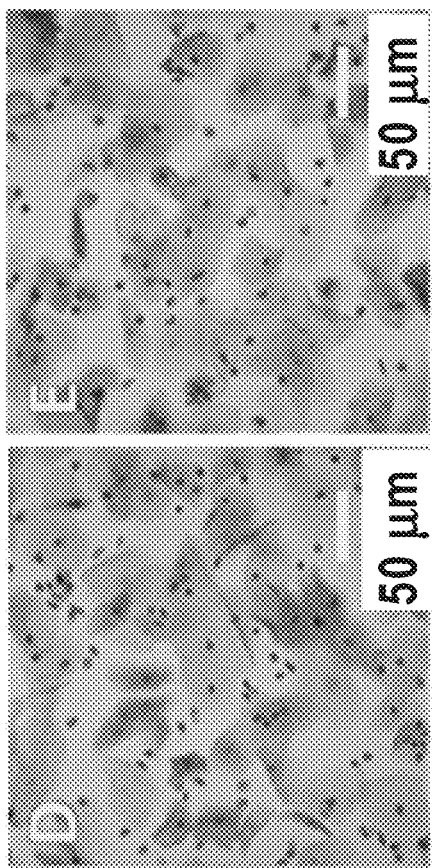
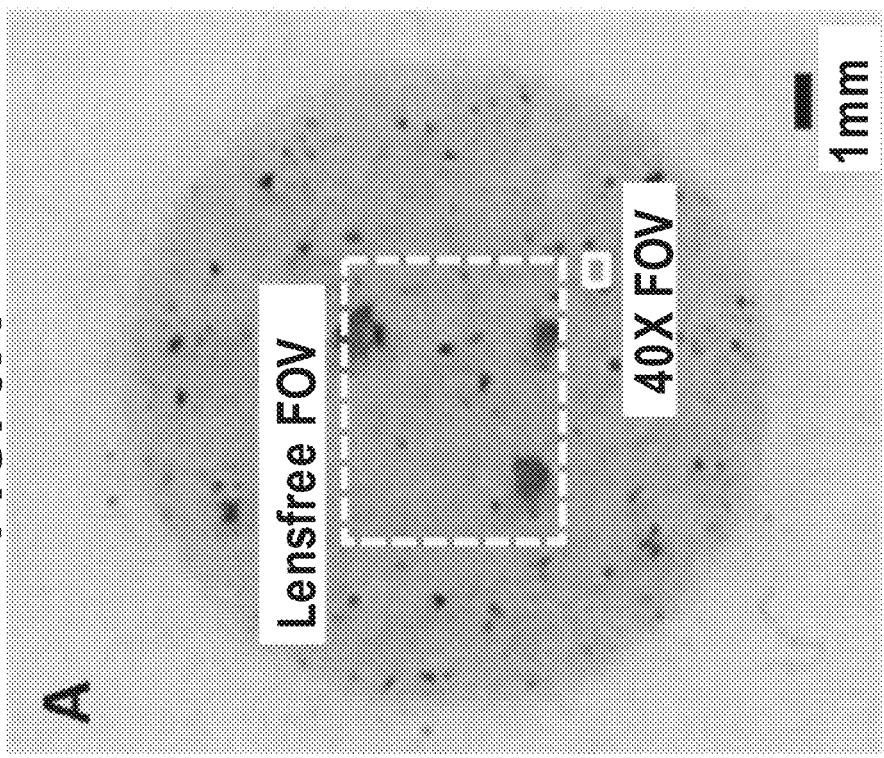
Lensfree amplitude image (colored)
40X Microscope image, 0.75NA
FIG. 9B  FIG. 9C  FIG. 9D  FIG. 9E  FIG. 9A

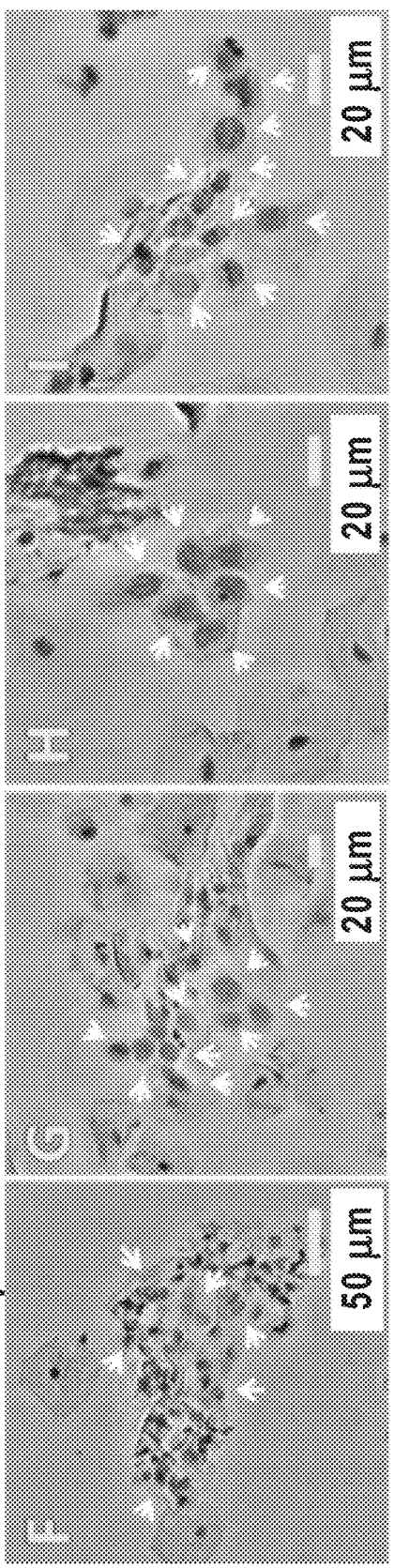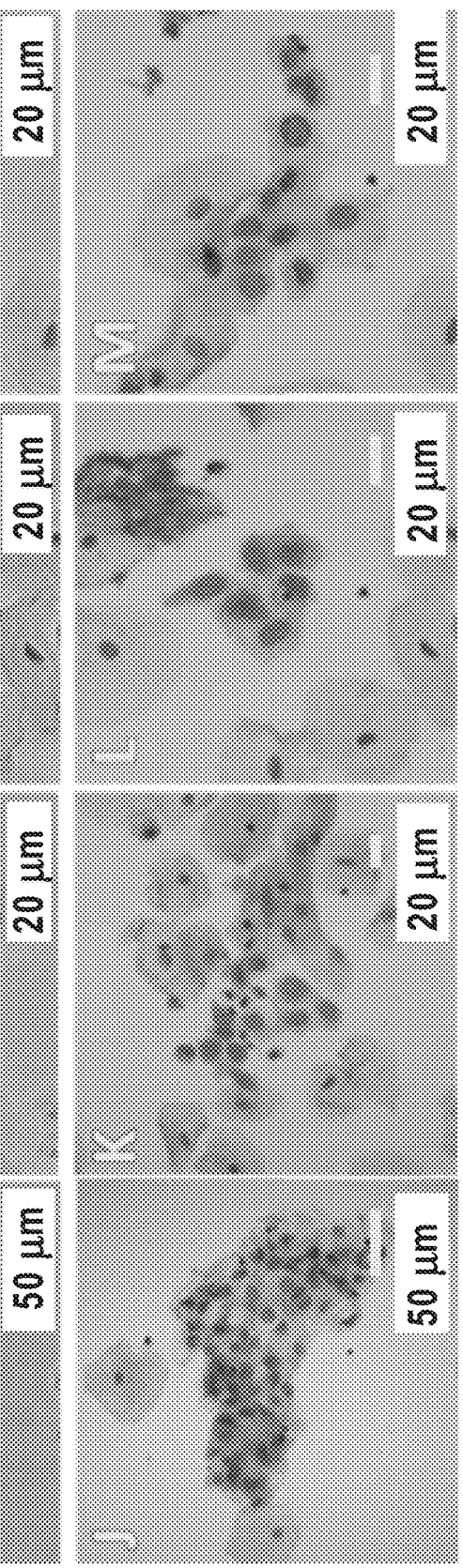
FIG. 9F FIG. 9G FIG. 9H FIG. 9I
Abnormal Pap Smear
FIG. 9J FIG. 9K FIG. 9L FIG. 9M
Lensfree amplitude image (colored)
40 Microscope image, 0.75NA

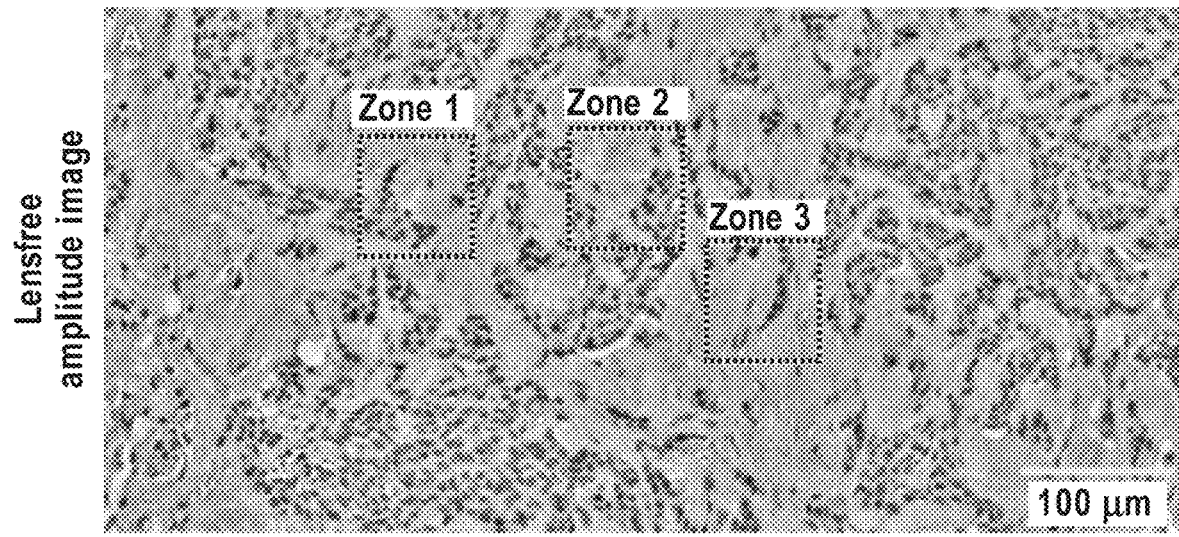
FIG. 10A
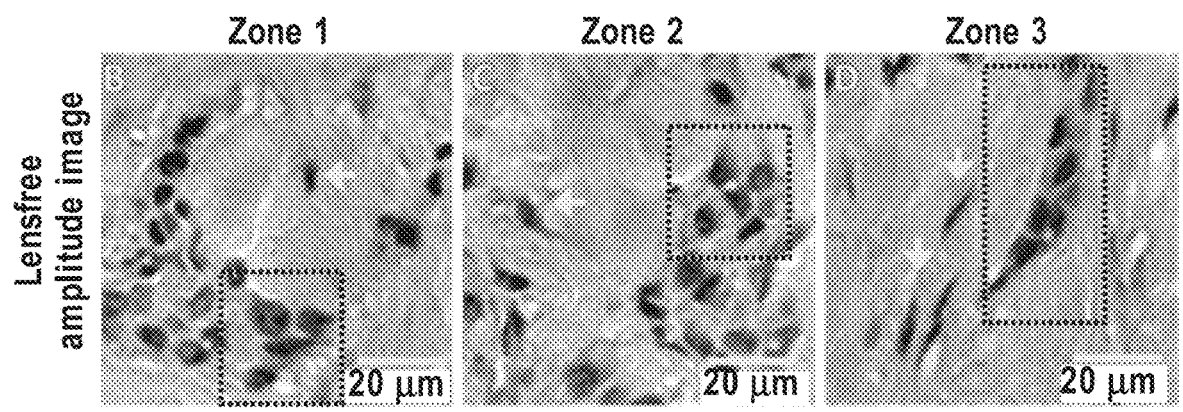
FIG. 10B     FIG. 10C     FIG. 10D
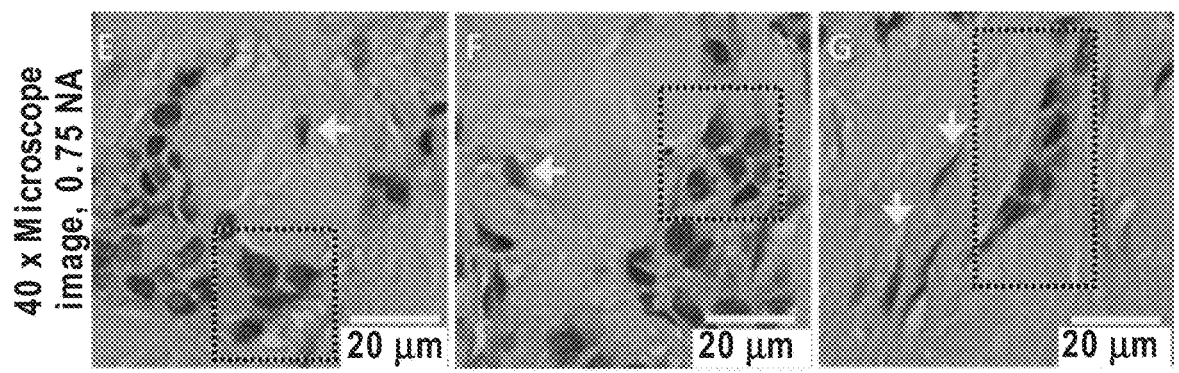
FIG. 10E     FIG. 10F     FIG. 10G

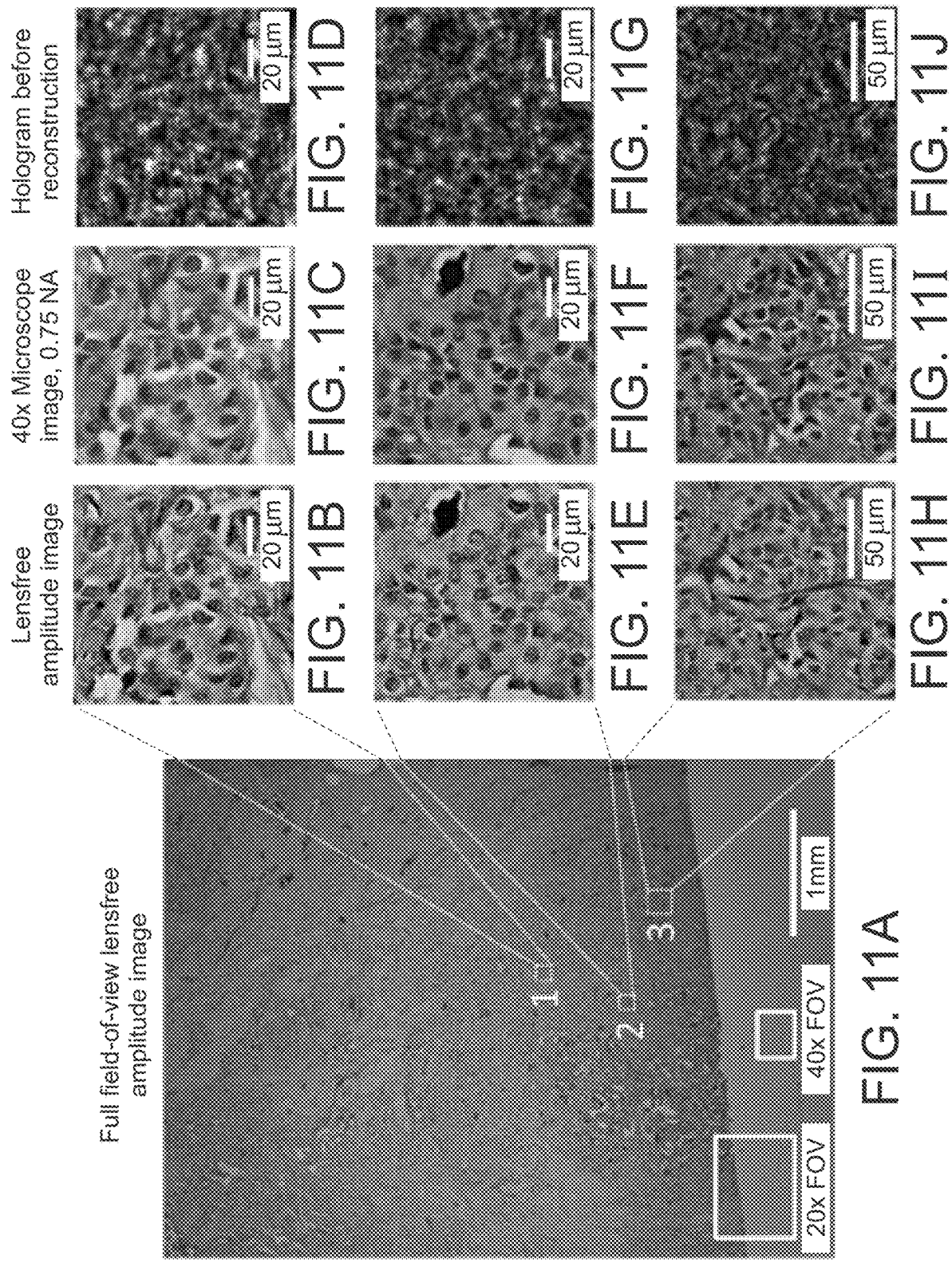

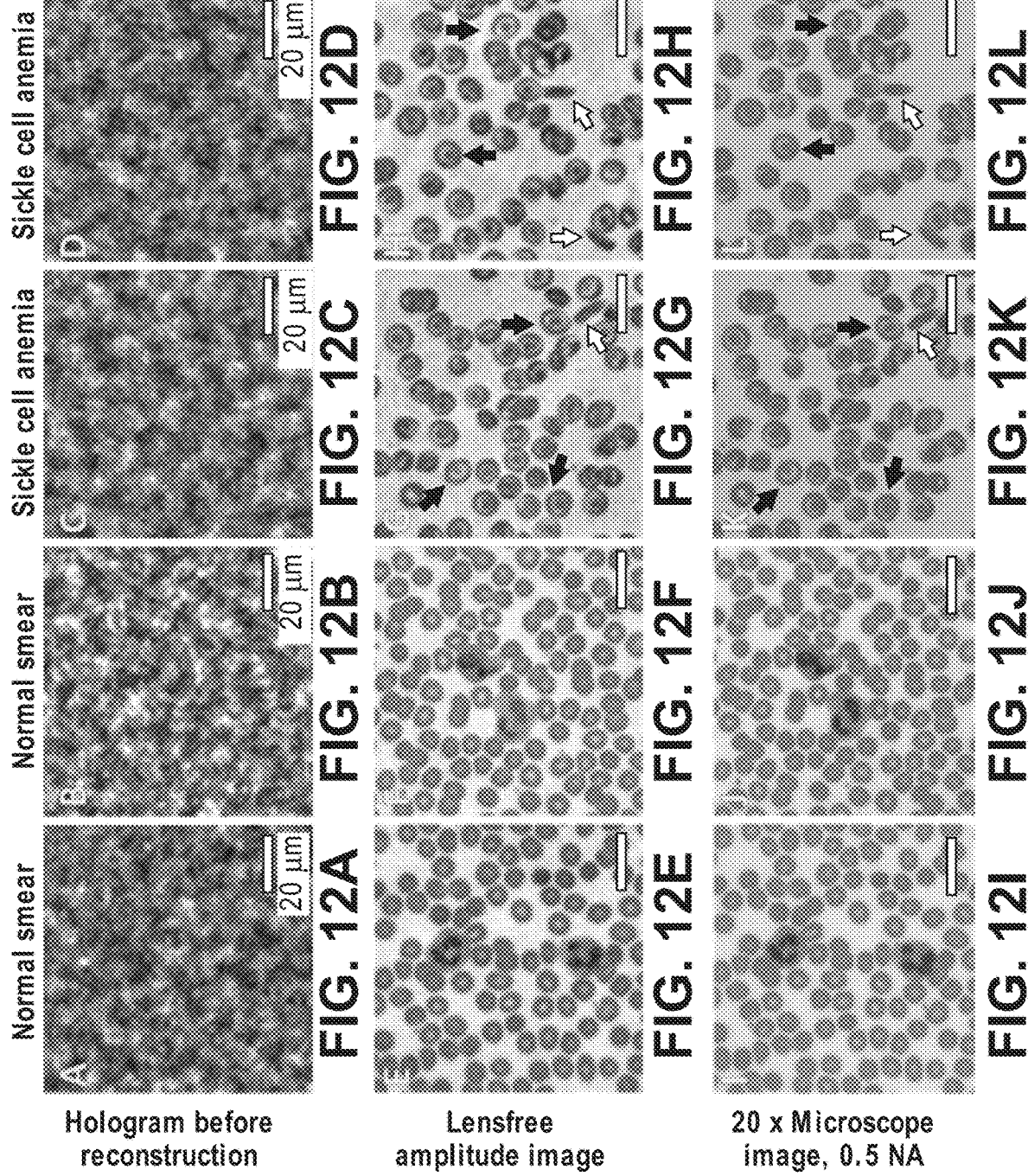

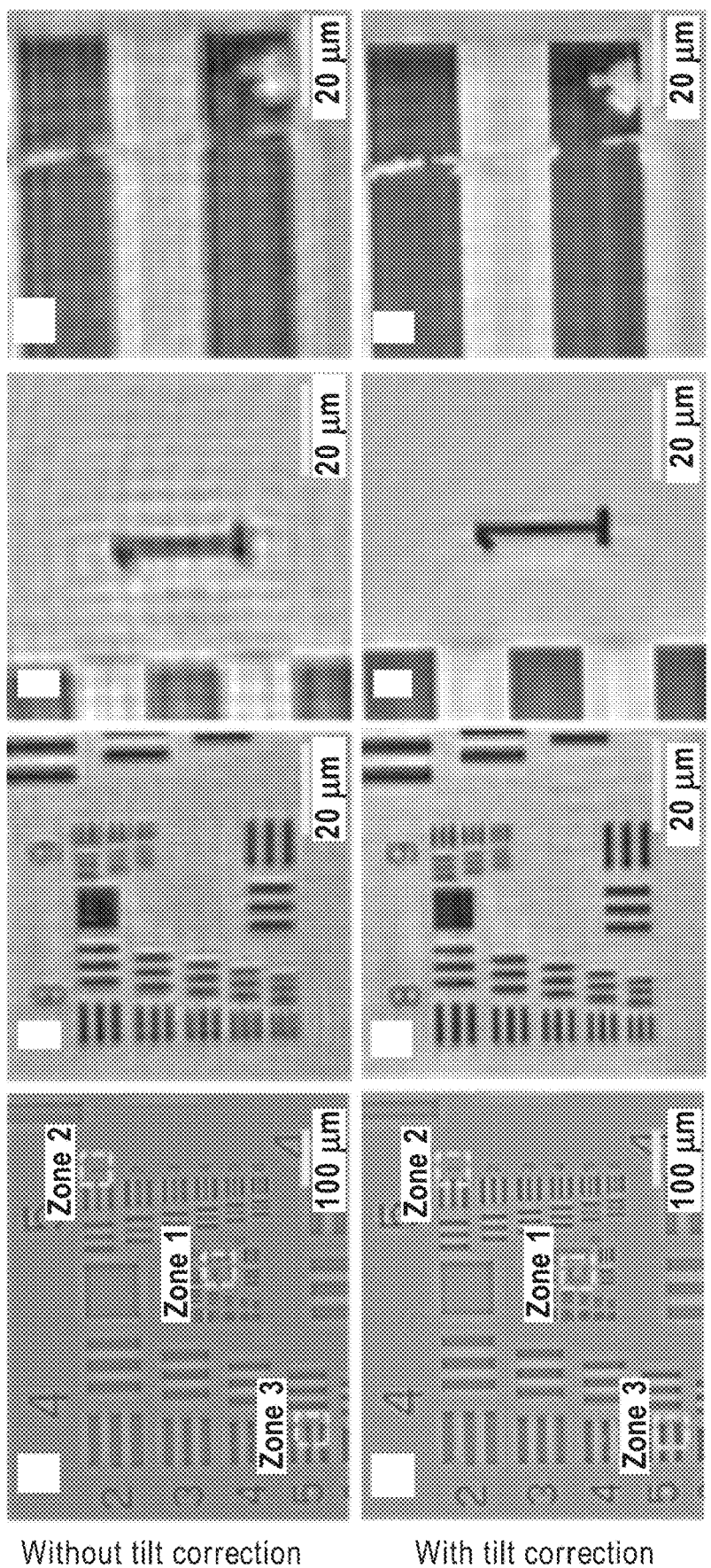

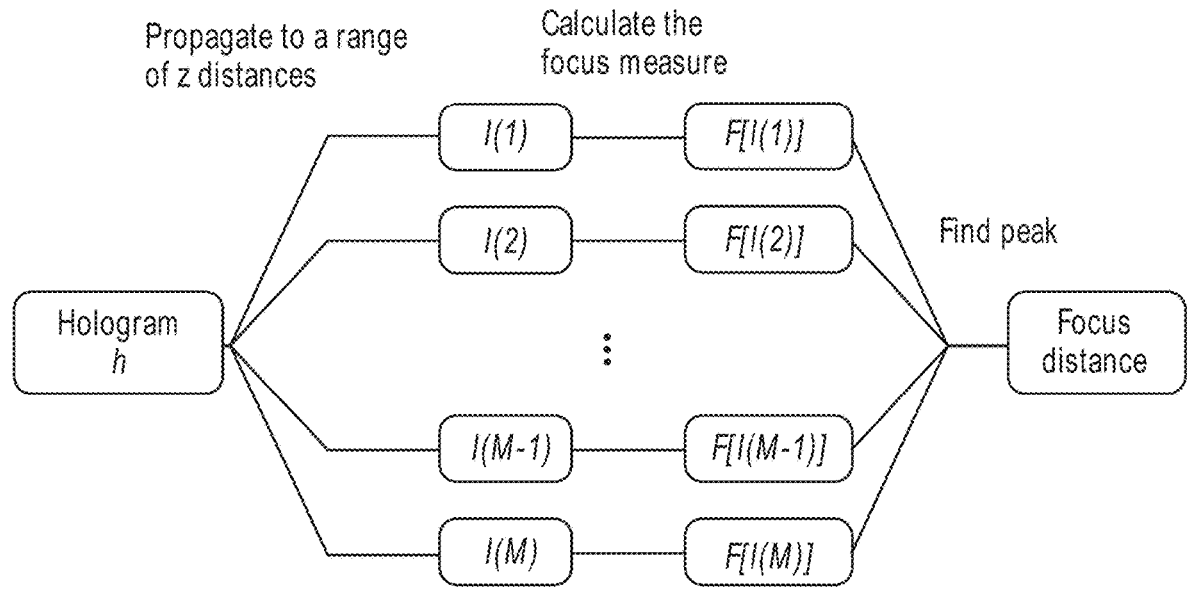

FIG. 14A $$F(I) = \frac{1}{MN} \sum_{m}^{M} \sum_{n}^{N} \left[ \nabla S(m,n) - \overline{\nabla S} \right]^2$$

$$\nabla S(m,n) = \sqrt{\nabla S_x(m,n)^2 + \nabla S_y(m,n)^2} \qquad \overline{\nabla S} = \frac{1}{MN} \sum_{m=1}^{M} \sum_{n=1}^{N} \nabla S(m,n)$$

$$\nabla S_x(m,n) = I \otimes S_x ; \quad S_x = \begin{pmatrix} -1 & 0 & 1 \\ -2 & 0 & 2 \\ -1 & 0 & 1 \end{pmatrix}$$

$$\nabla S_y(m,n) = I \otimes S_x ; \quad S_x = \begin{pmatrix} 1 & 2 & 1 \\ 0 & 0 & 0 \\ 1 & 2 & 1 \end{pmatrix} \qquad \text{where } \otimes \text{ represents the convolution operation}$$

FIG. 14B

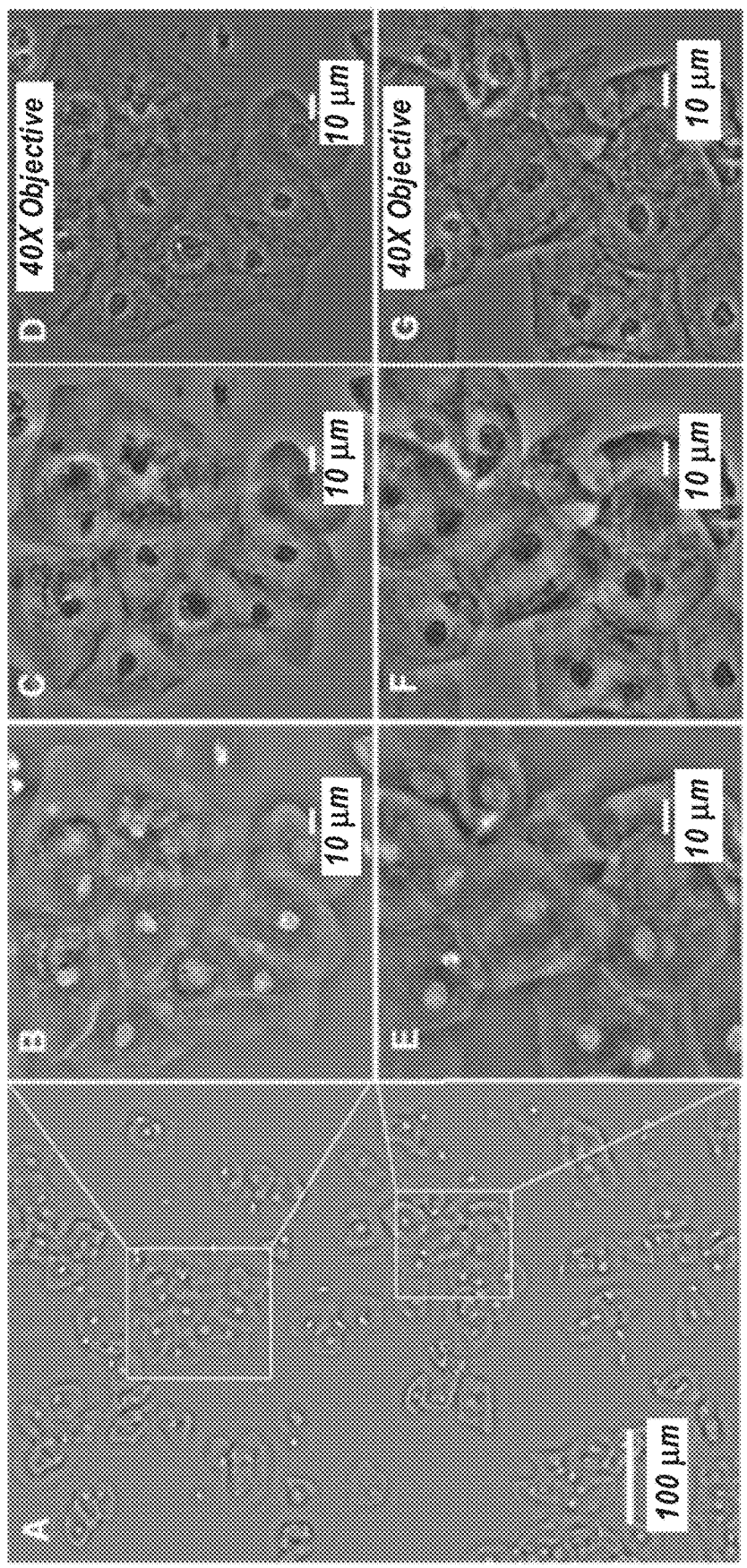

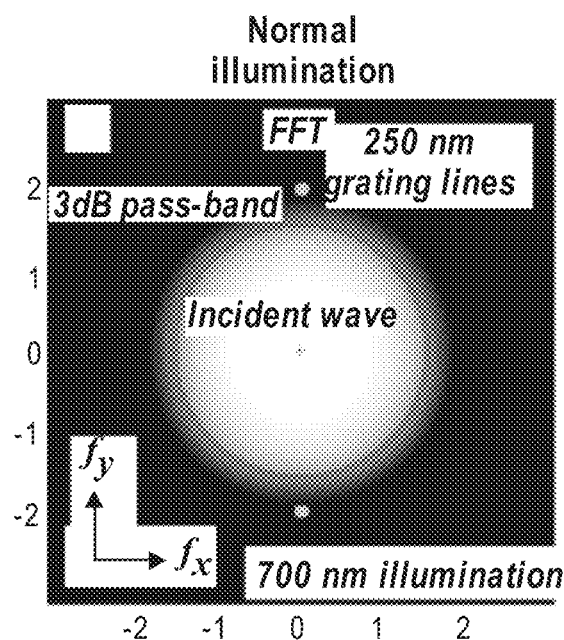
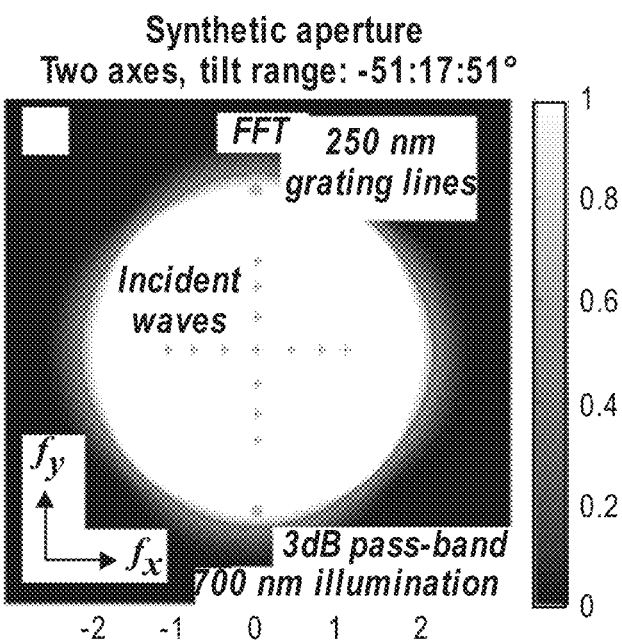
FIG. 17A  FIG. 17B
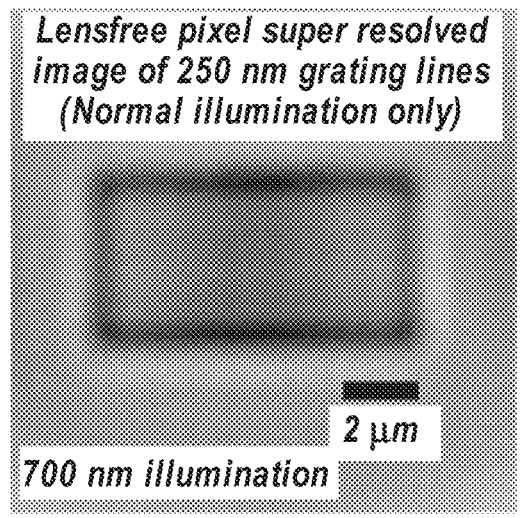
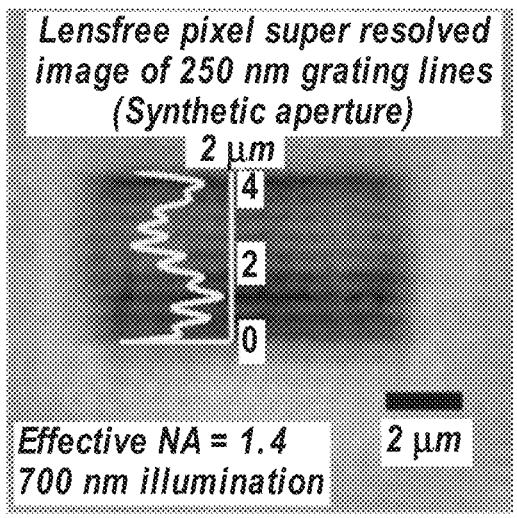
FIG. 17C  FIG. 17D

DEVICE AND METHOD FOR ITERATIVE PHASE RECOVERY BASED ON PIXEL SUPER-RESOLVED ON-CHIP HOLOGRAPHY

RELATED APPLICATION

This Application is divisional of U.S. application Ser. No. 15/500,880, now issued as U.S. Pat. No. 10,871,745, which itself is a U.S. National Stage filing under 35 U.S.C. § 371 of PCT Patent Application No. PCT/US2015/043266, filed Jul. 31, 2015, which claims priority to U.S. Provisional Patent Application No. 62/032,418 filed on Aug. 1, 2014. The contents of the aforementioned applications are incorporated by reference herein. Priority is expressly claimed in accordance with 35 U.S.C. §§ 119, 120, 365 and 371 and any other applicable statutes.

STATEMENT REGARDING FEDERALLY SPONSORED RESEARCH AND DEVELOPMENT

This invention was made with Government support under W911NF-11-1-0303, W911NF-13-1-0197, W911NF-13-1-0419, awarded by the U.S. Army, Army Research Office, N00014-12-1-0307, N00014-12-1-0849, awarded by the U.S. Navy, Office of Naval Research, OD006427, awarded by the National Institutes of Health, & 0954482, 1332275, awarded by the National Science Foundation. The Government has certain rights in the invention.

TECHNICAL FIELD

The technical field generally relates to imaging methods and more specifically to lens-free imaging devices and methods for high-resolution and wide-field imaging applications.

BACKGROUND

Digital holography has been experiencing a rapid growth over the last several years, together with the availability of cheaper and better digital components as well as more robust and faster reconstruction algorithms, to provide new microscopy modalities that improve various aspects of conventional optical microscopes. In an effort to achieve wide-field on-chip microscopy, the use of unit fringe magnification (F~1) in lens-free in-line digital holography to claim an FOV of ~24 mm$^2$ with a spatial resolution of <2 μm and an NA of ~0.1-0.2 has been demonstrated. See Oh C. et al., On-chip differential interference contrast microscopy using lens-less digital holography, Opt Express.; 18(5):4717-4726 (2010) and Isikman et al., Lens-free Cell Holography On a Chip: From Holographic Cell Signatures to Microscopic Reconstruction, Proceedings of IEEE Photonics Society Annual Fall Meeting, pp. 404-405 (2009). This work used a spatially incoherent light source that is filtered by an unusually large aperture (~50-100 μm diameter); and unlike most other lens-less in-line holography approaches, the sample plane was placed much closer to the detector chip rather than the aperture plane, i.e., $z_1 \gg z_2$. This unique hologram recording geometry enables the entire active area of the sensor to act as the imaging FOV of the holographic microscope since F~1.

More recently, a lens-free super-resolution holographic microscope has been proposed which achieves sub-micron spatial resolution over a large field-of-view of e.g., ~24 mm$^2$. See Bishara et al., "Holographic pixel super-resolution in portable lens-less on-chip microscopy using a fiber-optic array," Lab Chip 11, 1276 (2011). The microscope works based on partially-coherent lens-free digital in-line holography using multiple light sources (e.g., light-emitting diodes—LEDs) placed at ~3-6 cm away from the sample plane such that at a given time only a single source illuminates the objects, projecting in-line holograms of the specimens onto a CMOS sensor-chip. Because the objects are placed very close to the sensor chip (e.g., ~1-2 mm) the entire active area of the sensor becomes the imaging field-of-view, and the fringe-magnification is unit. As a result of this, these holographic diffraction signatures are unfortunately under-sampled due to the limited pixel size at the CMOS chip (e.g., ~2-3 pin). To mitigate this pixel size limitation on spatial resolution, several lens-free holograms of the same static scene are recorded as different LEDs are turned on and off, which creates sub-pixel shifted holograms of the specimens. By using pixel super-resolution techniques, these sub-pixel shifted under-sampled holograms can be digitally put together to synthesize an effective pixel size of e.g., ~300-400 nm, which can now resolve/sample much larger portion of the higher spatial frequency oscillations within the lens-free object hologram. Unfortunately, the imaging performance of this lens-free microscopy tool is still limited by the detection SNR, which may pose certain limitations for imaging of e.g., weakly scattering phase objects that are refractive index matched to their surrounding medium such as sub-micron bacteria in water.

To maintain a high numerical aperture (NA) and improved resolution across the entire visible spectrum, some of the major challenges that on-chip microscopy face include signal-to-noise ratio (SNR) deterioration mentioned above and aberrations that affect high spatial frequencies of the sample. The physical origin of this challenge for detection of high spatial frequencies on a chip is related to the relatively narrow angular response and large pixel size of opto-electronic image sensor chips. This effect gets much worse at longer illumination wavelengths since the diffraction angles of a given high spatial frequency band increase with wavelength. Although some computational approaches, which involve pixel super resolution and pixel function estimation or measurement can partially help to boost some of these spatial frequencies, on-chip microscopy so far has been limited to an NA of less than ~0.8-0.9.

SUMMARY

In one embodiment, a system and method of lens-free holographic on-chip microscopy is disclosed that can image pathology slides over an ultra-wide FOV with a spatial resolution and contrast sufficient for pathologists to perform clinical investigation and diagnosis. In experiments, invasive carcinoma cells within human breast sections were imaged with the system. Experiments were also conducted on Papanicolaou (Pap) smears consistent with a high-grade squamous intraepithelial lesion as well as sickle cell anemia blood smears. The results demonstrate three-dimensional (3D) pathology slide imaging using on-chip microscopy; matching clinical pathology needs. This milestone performance is enabled by the solution of transport of intensity equation (TIE) to generate an initial phase guess to the multi-height based iterative phase retrieval algorithm as well as rotational field transformations implemented in pixel super-resolved partially-coherent in-line holography. This approach can not only image specimen in 3D, but also digitally correct for uncontrolled mechanical tilts and height variations between the sample and the image sensor planes, which makes it much more powerful and realistic compared to contact (i.e., shadow) imaging approaches that strictly demand flat (i.e., two-dimension (2D)) and parallel-placed samples with sub-micron gap precision on a chip. Lens-free computational microscopy on a chip can have unique translational impact on the practice of pathology in resource limited clinical settings since this cost-effective microscope not only records high-quality images over a wide FOV, but also retrieves the complex optical field of the specimen such that the pathologist can digitally adjust the focus of the sample after image capture, providing a virtual depth-of-field experience for investigating sample slides, matching the manual depth adjustment that is routinely practiced in clinical examination of specimen under traditional light microscopes. The presented platform offers medical personnel a powerful, yet cost-effective and simple tool to acquire high-resolution and clinically relevant 3D images of biological specimen across large FOVs, which is of paramount importance especially when large areas need to be inspected for diagnosis.

In another embodiment, a record high NA of 1.4 in on-chip microscopy is demonstrated using a synthetic aperture approach based lens-free holographic imaging, where the sample is sequentially illuminated at various angles using a partially-coherent light source. In this approach, which is termed "LISA" (Lens-free Imaging using Synthetic Aperture), at each hologram recording process using an oblique illumination angle, some of the higher spatial frequencies that are normally attenuated or missed by the sensor chip are shifted to the lower spatial frequencies where the response of the pixels is significantly improved. This frequency shifting process due to angular diversity in illumination could also enable some of the evanescent waves that would normally never reach the sensor chip to be converted to travelling waves, permitting the digital synthesis of an NA that is larger than the refractive index of air.

In addition to achieving the largest NA reported for on-chip microscopy, combining the information acquired at different illumination angles also significantly improves the overall SNR of the spatial frequency map of the sample, which permits robust phase recovery even for dense and connected samples, such as histopathology slides, without the need for multi-height scanning or any prior information about the specimen/object. To demonstrate LISA's success in complex wave retrieval, lens-free color imaging was performed of breast cancer tissue samples that are stained by Hematoxylin and Eosin (H&E) over a very large FOV of 20.5 mm$^2$, which is equal to the active area of the sensor chip. Furthermore, the device and system achieved high-resolution imaging of unlabeled biological samples, such as unstained Papanicolaou (Pap) smears. Such unstained pathology samples do not exhibit sufficient contrast in intensity and therefore are difficult to observe unless phase contrast objective-lenses and special illumination schemes are used. With the LISA method, however, one can image these unstained samples using the reconstructed phase information without a change in either the imaging set-up or the reconstruction algorithm.

Compared to other applications of synthetic aperture techniques in microscopy LISA has important advantages in terms of significantly wider FOV, simplicity, compactness and cost-effectiveness of imaging set-up, and could be quite useful for various biomedical and physical sciences related applications that demand high-resolution and large FOV microscopic imaging.

In one embodiment, a method for lens-free imaging of an object includes the steps of a) illuminating a sample located a distance $z_1$ away from a light source; b) obtaining a first plurality of images of the sample with a sensor disposed a distance $z_2$ away from the sample, wherein $z_1 \gg z_2$, wherein the plurality of images are obtained by changing the relative position of the light source, sensor, or sample in small in-plane increments; c) adjusting the distance $z_2$; d) obtaining an additional plurality of images of the sample at the adjusted distance $z_2$, wherein the plurality of images are obtained by changing the relative position of the light source, sensor, or sample in small in-plane increments; e) repeating operations c) and d) a plurality of times; f) generating a high-resolution pixel super-resolved hologram at each distance $z_2$ from the first plurality of images and the additional plurality of images; and g) recovering lost phase information of the high-resolution pixel super-resolved hologram at a given $z_2$ distance using the following: 1) assuming an initial phase estimate for a given measurement at a $z_2$ distance; 2) updating the phase estimate from (1) using forward propagation of a complex estimated optical wave to a new $z_2$ distance, which generates a new amplitude and phase information for the forward propagated complex wave; 3) at the new $z_2$ distance, the amplitude of the super resolved hologram replaces the currently computed amplitude information of the forward propagated complex wave from (2) and the new phase is retained for next iterations; 4) forward propagate the complex estimated wave to reach a new $z_2$ distance; 5) repeating steps 3) and 4) among all or a sub-set of the measured planes corresponding to different $z_2$ distances as a loop until convergence is achieved; and h) outputting a phase-recovered complex field at an object plane based on the recovered lost phase information obtained in g) for one or more $z_2$ planes.

In another embodiment, a method for lens-free imaging of objects using a sensor includes illuminating a sample containing one or more objects with a light source at a plurality of different illumination angles, wherein at each different angle the light source, sensor, or sample is relatively shifted in small in-plane increments; obtaining a plurality of images of the one or more objects with the sensor, wherein the plurality of images comprise multiple shifted images at each different angle; generating a plurality of high-resolution pixel super-resolved holograms from the plurality of images, wherein each high-resolution pixel super-resolved hologram corresponds to a different illumination angle; recovering phase information of the high-resolution pixel super-resolved holograms for each angle. Phase information is recovered by: a) generating an initial guess of the complex field representing the sample; b) applying phase modulation and forward-propagation to a sensor plane; c) updating the amplitude of the field using a square root of the diffraction pattern measured at each angle; d) back propagating the updated field to a sample plane and removing phase modulation; e) updating a sub-region of the frequency domain using the back propagated field; and f) repeating steps (a) through (e) for each angle. The phase-recovered complex field at an object plane based on the recovered lost phase information is then outputted for one or more angles.

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications. Moreover aspects of one embodiment may be utilized in other, different embodiments.

BRIEF DESCRIPTION OF THE DRAWINGS

In FIG. 8A, the solution of TIE was used as the initial phase guess for the multi-height phase-recovery algorithm. Scale bar is 20 µm.

In FIG. 8B, a random phase was used as the initial phase guess for the multi-height phase-recovery algorithm. Scale bar is 20 µm.

FIG. 9A is a photograph of a normal Pap smear slide (SurePath preparation).

FIGS. 9B and 9C illustrate a lens-free amplitude images of a normal Pap smear slide in FIG. 9A. For comparison, the FOV of the lens-free microscope and of a bright field microscope equipped with a 40× objective lens are marked by a dashed and a solid rectangle, respectively.

FIGS. 9D and 9E illustrates microscope comparison images (of same areas used for FIGS. 9B and 9C) taken with a 40×0.75 NA objective lens.

FIG. 9F is a lens-free color image of atypical squamous cells. The white arrows mark a cluster of squamous epithelial cells with nuclear crowding, increased nuclear to cytoplasmic ratios, and slightly irregular nuclear contours.

FIGS. 9G-9I illustrate lens-free color images that show cells with high nuclear to cytoplasmic ratios, markedly irregular nuclear contours, hyperchromasia, and scant cytoplasm (white arrows). These findings are consistent with a high grade squamous intraepithelial lesion.

FIGS. 9J-9M illustrate microscope comparison images of the images of FIGS. 9F-9I taken with a 40× objective lens (0.75 NA).

FIG. 10A illustrates a lens-free amplitude image that shows invasive carcinoma cells arranged in irregular nests within the connective tissue. The image was captured using a single illumination wavelength ($\lambda$=550 nm) and automatically colored using a transformation that maps intensity to color.

FIGS. 10B-10D illustrated magnified or zoomed in lens-free amplitude images of zones 1-3, respectively of FIG. 10A. The cells within the dashed boxes are invasive carcinoma cells with increased nuclear to cytoplasmic ratios, hyperchromasia, irregular nuclear contours, and scant cytoplasm. The arrows point to abnormal cells those are adjacent to benign stromal cells within the connective tissue.

FIGS. 10E-10G illustrate microscope comparison images of FIGS. 10B to 10D taken with a 40× objective lens (0.75 NA).

FIG. 11A illustrates a full FOV (20.5 mm$^2$) lens-free amplitude image of a specimen of invasive ductal carcinoma of the human breast. The sample is ~7 µm thick and therefore it is rather challenging to image in transmission using traditional in-line holographic methods. For comparison, the fields-of-view of 40× and 20× microscope objectives are also shown using white solid rectangles.

FIGS. 11B-11D illustrate magnified regions of the lens-free image, which show a disorderly epithelial cell proliferation with cribriform growth. The cells exhibit nuclear enlargement, slightly irregular nuclear contours, open chromatin, and moderate delicate cytoplasm.

FIGS. 11E-11G illustrate microscope comparison images of (FIGS. 11B to 11D) taken with a 40× objective lens (0.75 NA).

FIGS. 11H-11J illustrate super-resolved lens-free holograms before digitally reconstructed to yield the images shown in FIGS. 11B to 11D.

FIGS. 12A-12D illustrate super-resolved lens-free holograms of normal and sickle cell anemia blood smears before reconstruction. All scale bars are 20 μm.

FIGS. 12E-12H illustrate lens-free amplitude images that are reconstructed from the respective holograms in FIGS. 12A-12D. All scale bars are 20 μm.

FIGS. 12I-12L illustrate 20× microscope (0.5 NA) comparison images of FIGS. 12E-12H, respectively. All scale bars are 20 μm.

FIG. 13A illustrates a lens-free amplitude image that was reconstructed without using tilt correction.

FIGS. 13B-13D illustrates zoomed in images of zones 1-3 respectively in FIG. 13A. Spatial aberrations caused by the physical tilts among planes are apparent.

FIG. 13E illustrates a lens-free amplitude image that was reconstructed by compensating for these tilts during the multi-height phase recovery algorithm.

FIGS. 13F-13H illustrates zoomed in images of zones 1-3 respectively in FIG. 13E. These reconstructed lens-free images, due to digital tilt correction, do not exhibit the aberrations that were observed in images FIGS. 13B-13D.

FIG. 14A is a schematic diagram of the autofocus algorithm that is used.

FIG. 14B illustrates the measure of focus that is used in the autofocus algorithm (Sobel gradient magnitude).

FIG. 16A illustrates a LISA phase image of an unstained Papanicolaou smear. This image was obtained after six (6) iterations of the iterative synthetic aperture reconstruction algorithm. The sample-to-sensor distance is ~350 μm.

FIG. 16B illustrates a magnified view of highlighted portion of FIG. 16A. Note that with a regular lens-based microscope, these unstained cells suffer from poor contrast and could not be imaged, while the lens-free phase images reveal subcellular features of the specimen.

FIG. 16C illustrates a lens-free digital phase contrast image of the same region illustrated in FIG. 16B.

FIG. 16D illustrates an image of the same region illustrated in FIG. 16C using a conventional microscope using a 40× objective-lens (NA=0.75).

FIG. 16E illustrates a magnified view of highlighted portion of FIG. 16A.

FIG. 16F illustrates a lens-free digital phase contrast image of the same region illustrated in FIG. 16E.

FIG. 16G illustrates an image of the same region illustrated in FIG. 16F using a conventional microscope using a 40× objective-lens (NA=0.75).

FIG. 17A illustrates imaging system passbands in the spatial frequency domain, without the synthetic aperture. The spatial frequencies of the grating lines are marked by dots.

FIG. 17B illustrates imaging system passbands in the spatial frequency domain, with the synthetic aperture. The spatial frequencies of the grating lines are marked by dots.

FIG. 17C illustrates the lens-free amplitude image of 250 nm grating line with normal illumination (no synthetic aperture reconstruction).

FIG. 17D illustrates the lens-free amplitude image of 250 nm grating line with the synthetic aperture reconstruction being used. To reconstruct the image in FIG. 17D, illumination angles of −51°:17:51° across two axes are used ($\lambda$=700 nm), and four iterations were sufficient to achieve convergence. Note that the sample-to-sensor distance is ~100 μm.

DETAILED DESCRIPTION OF THE ILLUSTRATED EMBODIMENTS

Figure 1A:
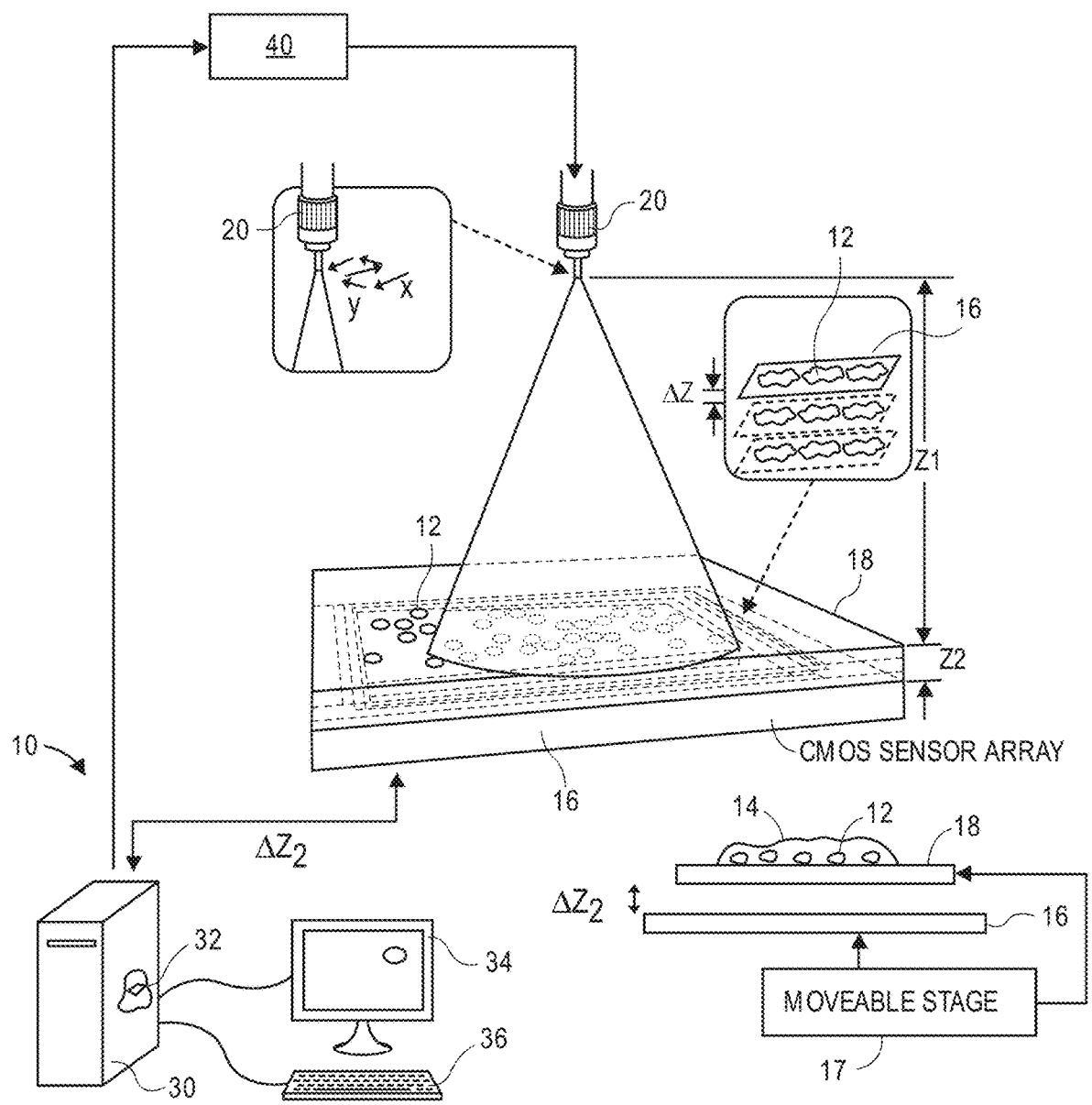
FIG. 1A illustrates a system for imaging one or more objects within a sample according to one embodiment.
Figure 1B:
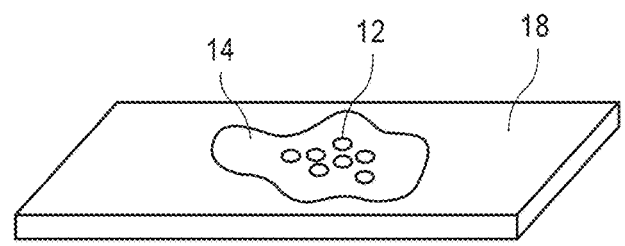
FIG. 1B illustrates a sample holder containing sample and one or more objects therein.

FIG. 1A illustrates a system 10 according to one embodiment for imaging of one or more objects 12 within a sample 14 (best seen in FIG. 1B). The objects 12 may include features contained within a tissue sample 14 such as that found within a histological slide that is typically used by a pathologist. The objects 12 may also include multi-cellular features, individual cells or a biological component or constituent (e.g., a cellular organelle or substructure) either found within a tissue sample 14 or other preparation (e.g., blood smear). Alternatively, the objects 12 may include particles or other object. The methods and systems described herein have particularly applicability for pathological tissue samples 14 that are evaluated for clinical purposes. These can include, for example, biopsy or other tissue samples that generated for pathological evaluation by a pathologist or other trained clinician.

FIG. 1A illustrates objects 12 in the form of morphological features of cells contained within a tissue sample 14. Morphological features include by way of illustration and no limitation, such things as cell membrane shape and features, nuclear shape and contour, nucleus size, cytoplasm size and state. Various organelles or organelle components can also be evaluated for morphological aspects and features that are useful for clinical diagnosis and decision making. As seen in FIG. 1A, the tissue sample 14 that is imaged is disposed some distance $z_2$ above an image sensor 16. As explained herein, this distance $z_2$ is adjustable as illustrated by the $\Delta z_2$ in the inset views of FIG. 1A.

The sample 14 containing one or more objects 12 is typically placed on an optically transparent sample holder 18 such as a glass or plastic slide, coverslip, or the like as seen in FIG. 1B. The $\Delta z_2$ may be changed by moving the sample holder 18 relative to the image sensor 16 or, alternatively, by moving the image sensor 16 relative to the sample holder 18. In yet another alternative, $\Delta z_2$ may be changed by moving both the sample holder 18 and the image sensor 16. For example, a moveable stage 17 may be coupled to the image sensor 16 or the sample 14 (via a sample holder 18 as explained below) to adjust $\Delta z_2$. For example, the moveable stage 17 may be coupled to a nut or the like (not shown) that moves in the z direction in response to rotation of a shaft or screw (not shown) coupled to the nut. The movable stage 17 preferably moves in generally increments ranging from about 1 µm to about 1.0 cm and more preferably between about 10 µm to about 100 µm. The moveable stage 17 may be actuated manually by a user using a knob, dial, or the like. Alternatively, the moveable stage 17 may be, in some embodiments, automatically controlled using a small actuator such as a motor, linear actuator, or the like. In yet another alternative, different sized (i.e., thicknesses) inserts (e.g., glass slides or the like) can be manually inserted between the sample holder 18 and the image sensor 16 to adjust the sample-to-sensor distance. Likewise, multiple inserts can be inserted between the sample holder 18 and the image sensor 16 to adjust the $z_2$ height.

Regardless, the surface of image sensor 16 may be in contact with or close proximity to the sample holder 18. Generally, the objects 12 within the sample 14 are located within several millimeters within the active surface of the image sensor 16. The image sensor 16 may include, for example, a charged coupled device (CCD) or a complementary metal-oxide semiconductor (CMOS) device. The image sensor 16 may be monochromatic or color. The image sensor 16 generally has a small pixel size which is less than 9.0 µm in size and more particularly, smaller than 5.0 µm in size (e.g., 2.2 µm or smaller). Generally, image sensors 16 having smaller pixel size will produce higher resolutions. As explained herein, sub-pixel resolution can be obtained by using the method of capturing and processing multiple lower-resolution holograms, that are spatially shifted with respect to each other by sub-pixel pitch distances.

Still referring to FIG. 1A, the system 10 includes an illumination source 20 that is configured to illuminate a first side (top side as seen in FIG. 1A) of the sample holder 18. The illumination source 20 is preferably a partially coherent light source (e.g., 2-5 nm bandwidth) but it may also include a coherent light source. Light emitting diodes (LEDs) are one example of an illumination source 20. LEDs are relative inexpensive, durable, and have generally low power requirements. Of course, other light sources may also be used such as a Xenon lamp with a filter. The illumination source 20 may be coupled to an optical fiber as seen in FIG. 1A or another optical waveguide. If the illumination source 20 is a lamp or light bulb, it may be used in connection with an aperture (not shown) or multiple apertures in the case of an array which acts as a spatial filter that is interposed between the illumination source 20 and the sample. The term optical waveguide as used herein refers to optical fibers, fiber-optic cables, integrated chip-scale waveguides, an array of apertures and the like. With respect to the optical fiber, the fiber includes an inner core with a higher refractive index than the outer surface so that light is guided therein. The optical fiber itself operates as a spatial filter. In this embodiment, the core of the optical fiber may have a diameter within the range of about 50 µm to about 100 µm. As seen in FIG. 1A, the distal end of the fiber optic cable illumination source 20 is located at a distance $z_1$ from the sample holder 18. The imaging plane of the image sensor 16 is located at a distance $z_2$ from the sample holder 18. In the system 10 described herein, $z_2 \ll z_1$. For example, the distance $z_1$ may be on the order of around 7 cm to around 15 cm. The distance $z_2$ may be on the order of around 100 µm to around 600 µm. Distances beyond those mentioned specifically herein may also be used.

Of course, as described herein, the $z_2$ distance is adjustable in increments ranging from about 1 µm to about 100 µm. The particular amount of the increase or decrease does not need to be known in advance. In the system 10, the propagation distance $z_1$ is such that it allows for spatial coherence to develop at the plane of the object(s) 12, and light scattered by the object(s) 12 interferes with background light to form a lens-free in-line hologram on the image sensor 16.

Still referring to FIG. 1A, the system 10 includes a computer 30 such as a laptop, desktop, tablet, mobile communication device, personal digital assistant (PDA) or the like that is operatively connected to the system 10 such that lower resolution images (e.g., lower resolution or raw image frames) are transferred from the image sensor 16 to the computer 30 for data acquisition and image processing. The computer 30 includes one or more processors 32 that, as described herein in more detail, runs or executes software that takes multiple, sub-pixel (low resolution) images taken at different scan positions (e.g., x and y positions as seen in inset of FIG. 1A) and creates a high resolution projection hologram image of the objects 12 for each different $z_2$ distance. The multiple, high resolution images obtained at different heights are registered with respect to one another using the software. The software may also be programmed to control various aspects of the device such as moveable stage 17, linear actuators/stages 23 used to provide x, y adjustments in the illumination source 20, switching on/off of the illumination source(s) 20, armature 21, and the like.

The software also digitally reconstructs the phase-recovered complex field of the objects 12 through an iterative phase recovery process that rapidly merges all the captured holographic information to recover lost optical phase of each lens-free hologram without the need for any spatial masking, filtering, or prior assumptions regarding the samples. As explained herein, after a few iterations, the phase of each lens-free hologram (captured at different heights) is recovered and the phase-recovered complex field at the object plane is obtained. The phase-recovered complex field can then be used to generate phase or amplitude images of the objects 12 at any height within the sample 14. The reconstructed images can be displayed to the user on, for example, a display 34 or the like. The user may, for example, interface with the computer 30 via an input device 36 such as a keyboard or mouse to select different imaging planes.

Figure 2A:
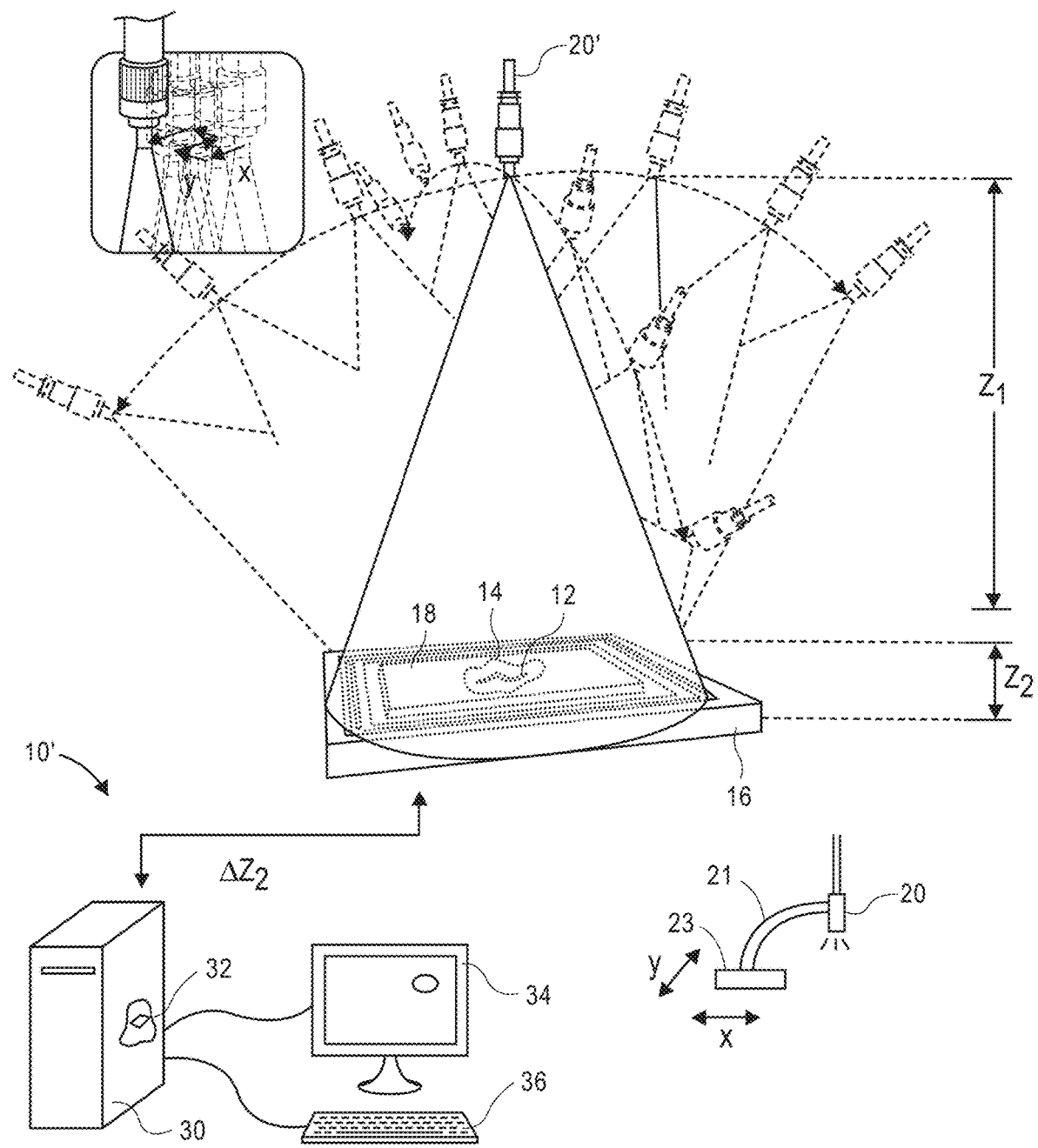
FIG. 2A illustrates a system for imaging one or more objects within a sample according to another embodiment.

FIG. 2A illustrates another embodiment of a system 10' for imaging of one or more objects 12 within a sample 14. Those elements that that are similar to the embodiment of FIG. 1A are shown with the same reference numbers. In this embodiment, the illumination source 20' is a partially coherent light source (e.g., spectral bandwidth of 2.5 nm) that is moveable along a three dimensional space to provide for angled illumination of the sample 14. Alternatively, the illumination source 20' may also include a coherent light source. For example, the illumination source 20' may be moveable along the 3D contours of a geometrical shape such as a dome or hemisphere to illuminate the sample 14 in multiple angles and from multiple directions (e.g., multiple angles on different axes). The illumination source 20' may be secured to a moveable armature 21 or the like (not illustrated) that may physically move the illumination source 20' or a waveguide coupled to the illumination source 20'. The rotational arm may be coupled to one or more linear stages 23 that provide lateral (x, y) shifts that is used for super-pixel resolution. In this embodiment, the image sensor 16 can be installed on a rotational mount so that the sensor 16 can be rotated within a lateral plane. Alternatively, multiple illumination sources 20' or multiple waveguides coupled to a common, switchable illumination source 20' may be positioned at various points along a 3D surface. In this embodiment, individual illumination sources 20' or waveguides can be actuated to illuminate the sample 14 at different angles. In yet another alternative, the sample 14 may be tilted relative to a stationary light source 20' to achieve the different illumination angles.

In the embodiment of FIG. 2A, like the embodiment of FIG. 1A, the $\Delta z_2$ distance may be changed by moving the sample holder 18 relative to the image sensor 16 or, alternatively, by moving the image sensor 16 relative to the sample holder 18 (or both). For example, the moveable stage 17 may be coupled to the image sensor 16 and/or the sample 14 (via a sample holder 18 as explained below) to adjust $\Delta z_2$. The embodiment of the system 10' is used to increase the effective NA of the reconstructed lens-free images (e.g., NA of 1.4).

Figure 3A:
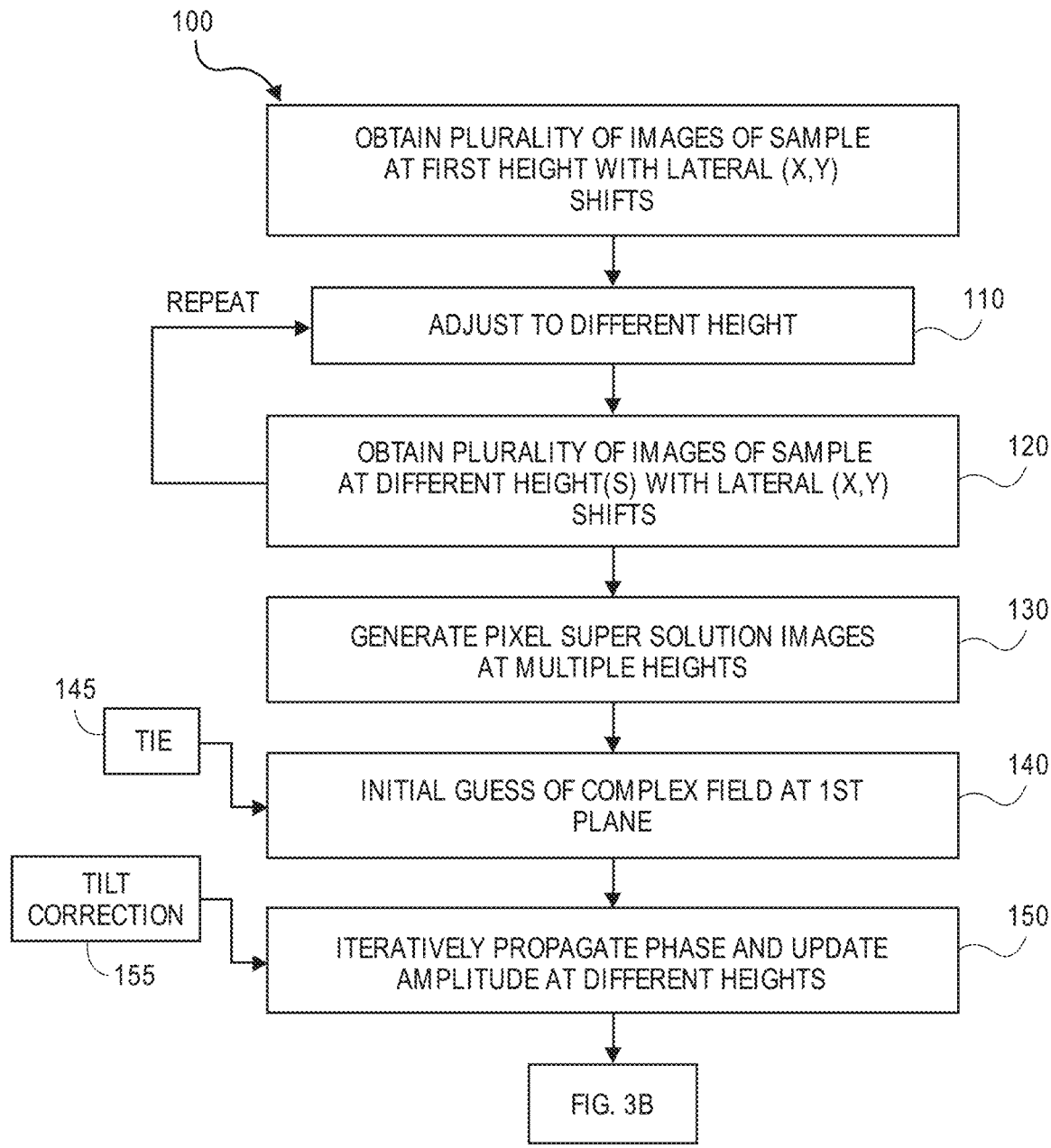
FIGS. 3A-3B illustrate a flowchart of operations for one embodiment that utilizes the system of FIG. 1A.
Figure 3B:
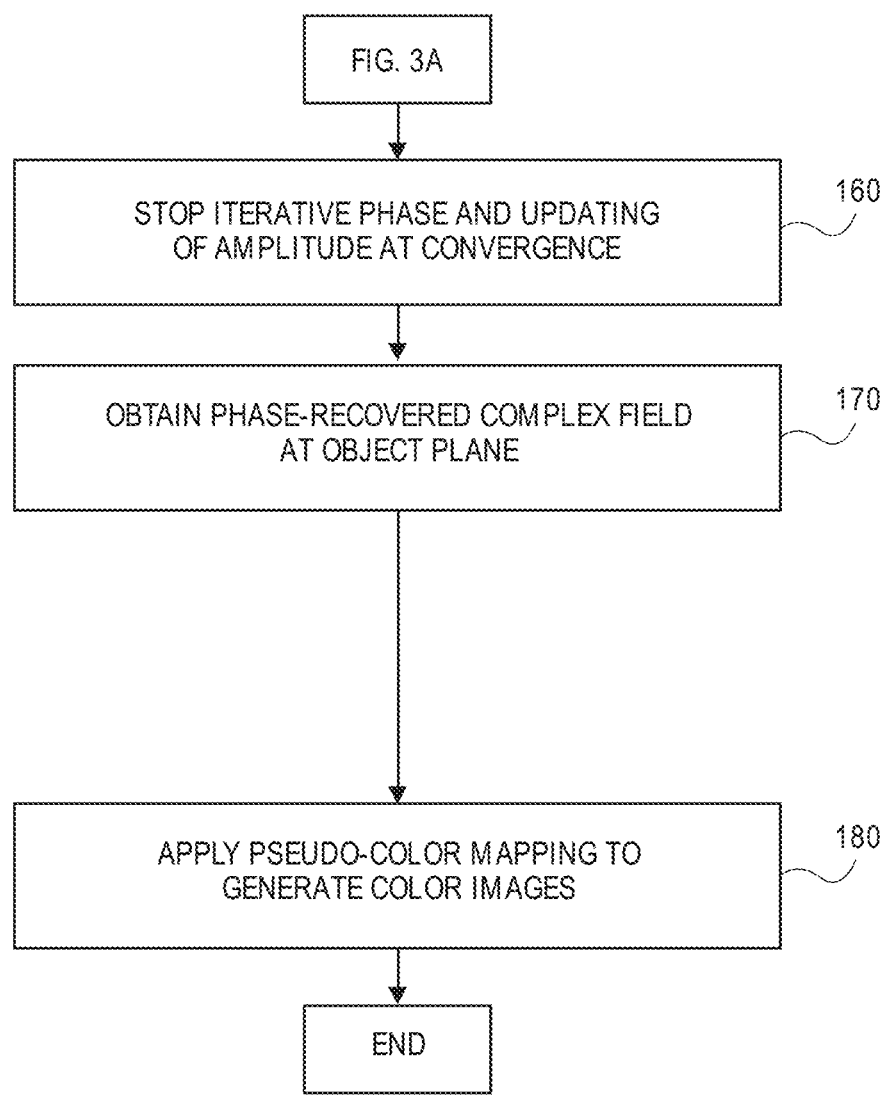

FIGS. 3A and 3B illustrate a method for lens-free imaging of a sample 14 using the system 10 illustrated in FIG. 1A. The sample 14 can be any type of sample but the method is particularly applicable to samples that contain a pathological sample. Referring to step 100, a plurality of images are obtained of the sample 14 at a first height with a series of lateral (e.g., x, y) shifts. Next, in step 110, the $Z_2$ distance is changed ($\Delta z_2$) to adjust to a different height. This may be accomplished moving the sensor 16, the sample 14, or both. Next, as seen in operation 120, a plurality of images is obtained of the sample 14 at a different height with a series of lateral (e.g., x, y) shifts. As seen in FIG. 3A, the steps of adjusting the $Z_2$ distance (step 110) and obtaining a plurality of images (step 120) is repeated a plurality of times. In step 130, pixel super-resolution images are generated. Pixel super-resolution images are created by multiple, lower resolution images that are digitally converted into a higher resolution image. The idea behind this technique is to use the images that are shifted with respect to one another by fractions of the low-resolution grid constant to better approximate the image sampling on a higher resolution grid. Details regarding the pixel super-resolution process may be found in Bishara W. et al., Lens-free on-chip microscopy over a wide field-of-view using pixel super-resolution. *Optics Express* 18:11181-11191 (2010), which is incorporated by reference as if set forth fully herein. This pixel super-resolution step takes lower resolution holographic shadows of the object(s) 12 (e.g., captured at for instance ~10 million pixels) and then creates a higher resolution lens-free hologram that now contains >300 million pixels over the same 30 mm² field-of-view with an effective pixel size of ~300 nm).

In step 140, an initial guess of the complex field a first plane is estimated. In the phase reconstruction process to retrieve the complex optical field of a dense specimen, the convergence of the below-described iterative process depends on the quality of the initial guess. In one preferred embodiment, the solution to the transport-of-intensity equation (TIE) is used to generate the initial phase guess as seen in operation 145. TIE is an elliptic partial differential equation that relates the phase of an optical field to the z-derivative of the field intensity. The transport-of-intensity equation is as follows:

$$\frac{\partial I(x, y)}{\partial z} = -\frac{\lambda}{2\pi} \nabla_\perp \cdot (I(x, y) \nabla_\perp \phi(x, y))$$

$I(x, y)$ Intensity of optical wave
$\phi(x, y)$ Phase of optical wave
$\lambda$ Optical wavelength
$z$ Position in the z-direction (axial position)

$$\frac{\partial I(x, y)}{\partial z}$$

Intensity derivative along the axial direction $$\nabla_\perp \nabla_\perp = \hat{x}\frac{\partial}{\partial x} + \hat{y}\frac{\partial}{\partial y}$$

Vector differential operator in the (x, y) plane

Unlike iterative methods, this equation deterministically computes the phase. The TIE performance is typically limited by the low-numerical-aperture assumption, imperfect knowledge of axial derivative of intensity, relatively high susceptibility to noise, and the need for the knowledge of the phase at the perimeter of the aperture, which is usually not available. However, the TIE phase solution is a good initial guess to the multi-height phase recovery algorithm that can accelerate convergence.

Figure 4A:
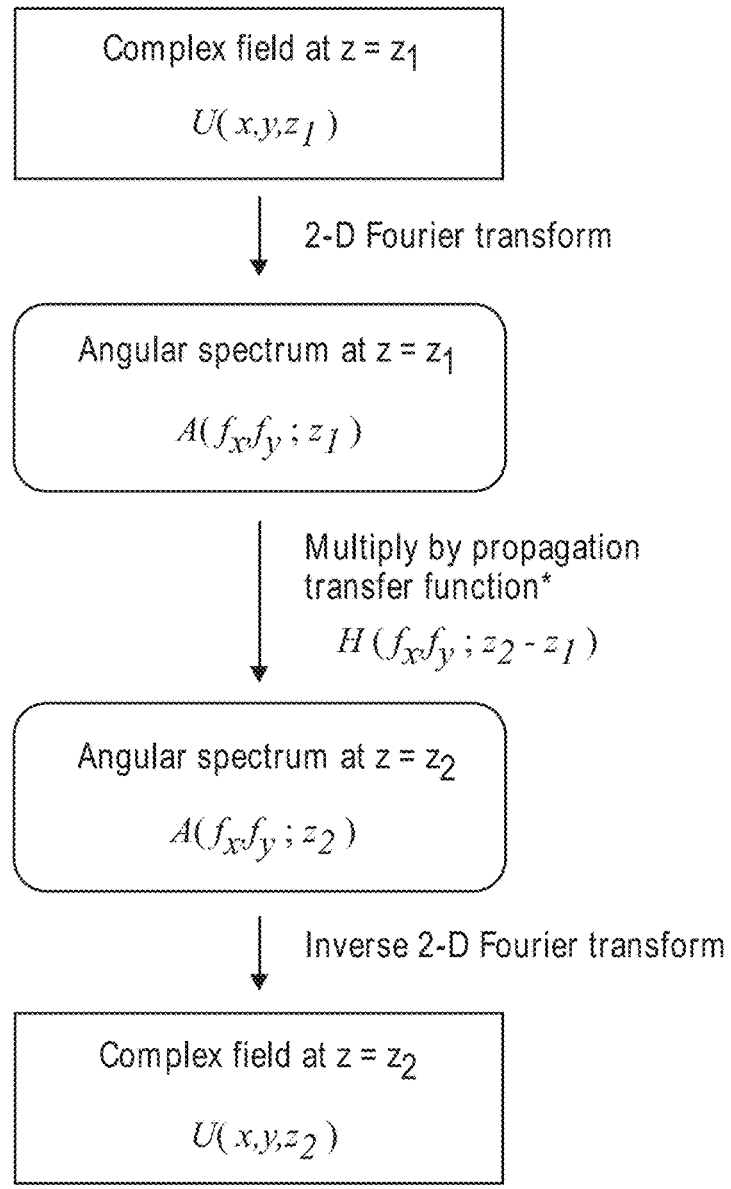
FIG. 4A illustrates a diagram of the complex field (e.g., wave) propagation algorithm that is used to propagate between parallel planes.
Figure 4B:
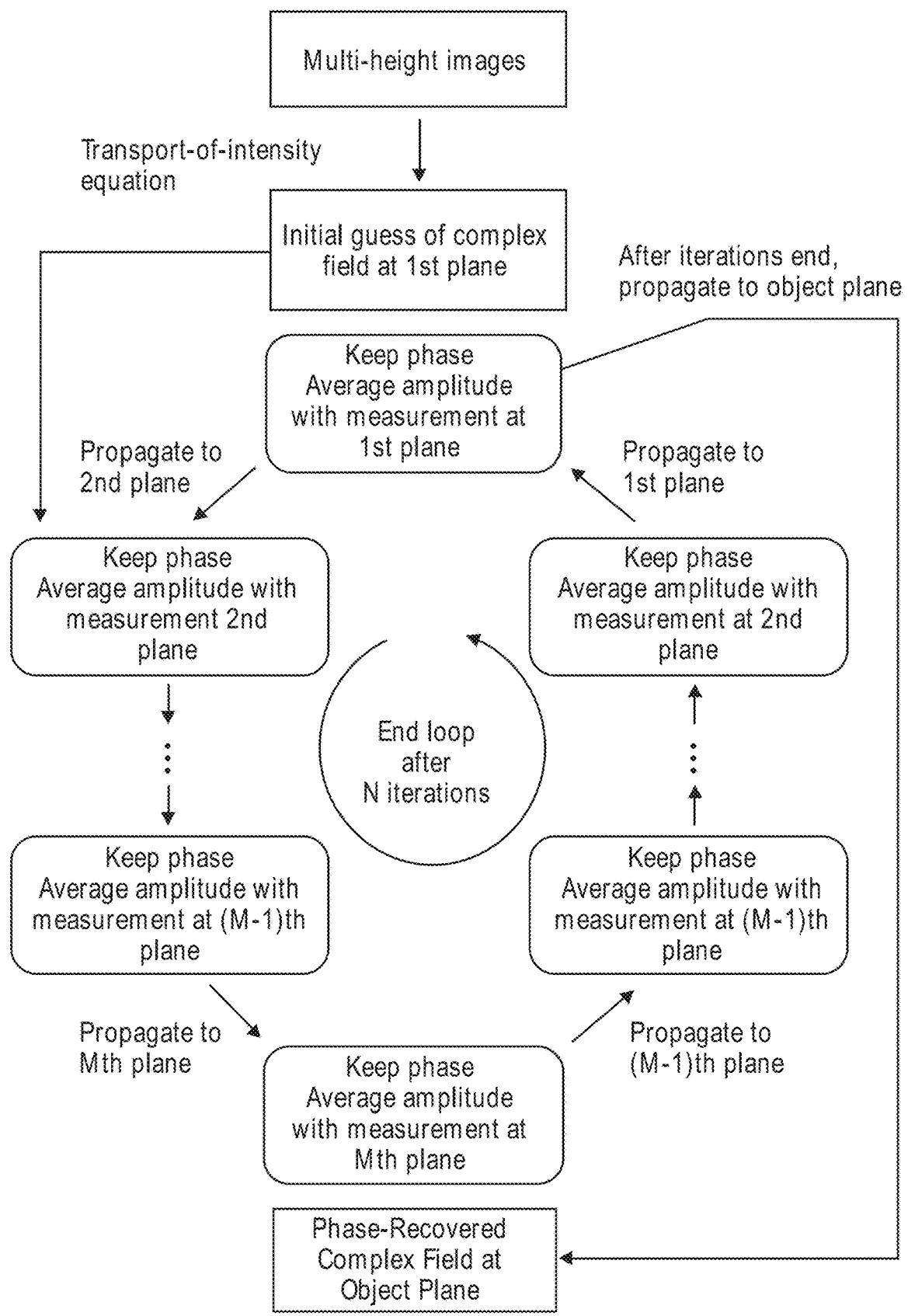
FIG. 4B illustrates a diagram of multi-height iterative phase retrieval algorithm. The pixel super-resolved multi-height image stack is fed to the algorithm as input. TIE is used to generate an initial guess of the complex field. Then the current guess of the complex field is iteratively propagated (using the algorithm outlined in FIG. 4A) from plane to plane, where in each plane, the resulting phase is retained while partially updating the amplitude according to the measurement acquired in the corresponding plane. After N iterations (usually N=10), the loop ends, and the complex field is propagated to the object plane to yield the complex image of the specimen.

In step 150, the method iteratively propagates the phase and updates the amplitude at different heights. This can be done in a deterministic (e.g., sequential) process from one height to a next height or it can be done in a random sequence. FIG. 4A illustrates a schematic diagram of wave propagation between parallel planes. In the iterative process, the current guess of the complex field is iteratively propagated from plane to plane using the algorithm of FIG. 4A, where in each plane, the resulting phase is retained while partially updating the amplitude according to measurement acquired in the corresponding plane (e.g., measurement from pixel super-resolution image). FIG. 4B illustrates a schematic view of the multi-height iterative phase retrieval algorithm that is used. The pixel super-resolved multi-height image stack is fed to the algorithm as the input with TIE being used as the initial guess.

Figure 5A:
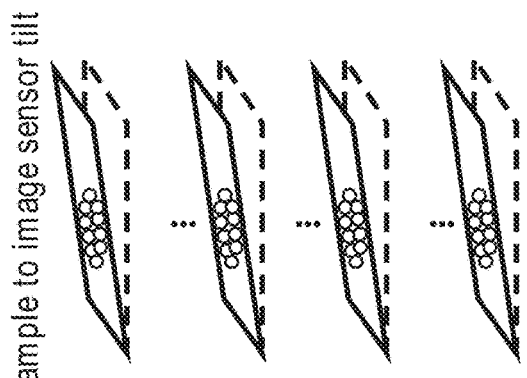
FIG. 5A illustrates that tilting between a sample and the image sensor is largely unavoidable when using a one-axis translation stage. By conceptually creating an intermediate object (dashed rectangular) that is parallel to the image-sensor plane, the multi-height phase recovery algorithm could be used to reconstruct the phase of the intermediate object.
Figure 5B:
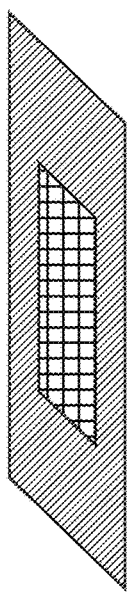
FIG. 5B illustrates that the reconstructed intermediate object, which is the output of the multi-height phase recovery algorithm, is just an out-of-focus projection of the specimen. Therefore by using a rotational field transformation one can project the intermediate object (dashed rectangle) to the sample plane (solid rectangle).
Figure 5C:
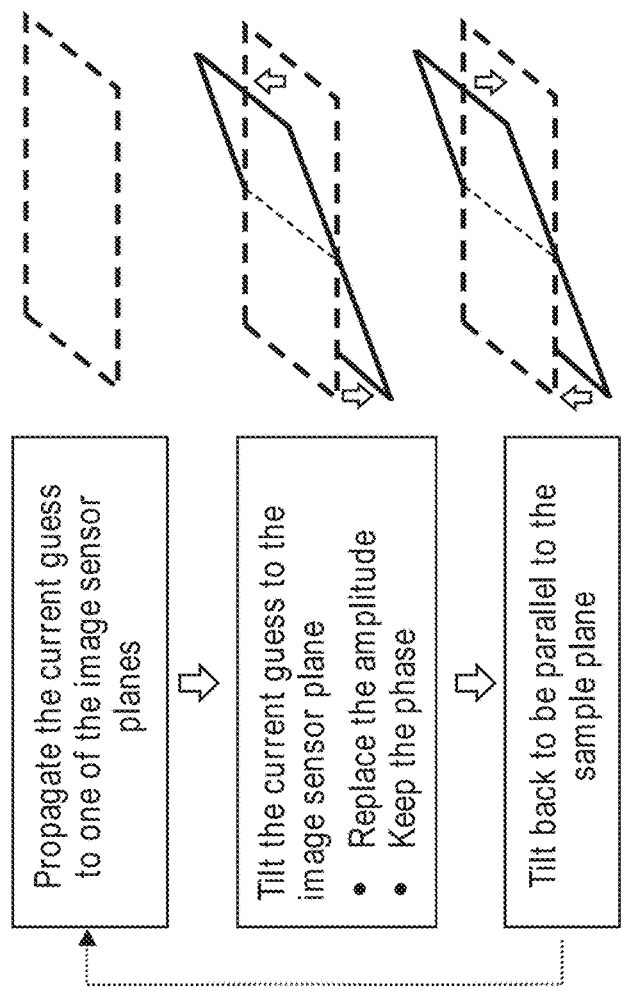
FIG. 5C illustrates a modification of the multi-height phase-recovery algorithm which corrects for such mechanical tilts between the sample and the image sensor planes.

Referring back to FIG. 3A, the iterative propagation step 150 includes a tilt correction option 155. Using a one-axis translation stage, there is unavoidable tilt (FIG. 5A) between the image sensor 16 and the sample planes that cannot be mechanically corrected. By conceptually creating an intermediate object (seen in FIGS. 5A and 5B as dashed rectangular area) that is parallel to the image-sensor plane, the multi-height phase recovery algorithm can be used to reconstruct the phase of the intermediate object. The reconstructed intermediate object, which is the output of the multi-height phase recovery algorithm, is just an out-of-focus projection of the specimen. Therefore by using a rotational field transformation one can project the intermediate object (dashed rectangle) to the sample plane (solid rectangle). FIG. 5C illustrates a modified algorithm for iterative propagation (step 150) that incorporates therein tilt correction 155. As seen in FIG. 5C, a current guess is propagated to one of the image sensor planes. The current guess is tilted to the image sensor plane and the amplitude is replaced (as explained above) and the phase is retained. Another tilt operation is performed to tilt back to be parallel to the sample plane.

Referring to FIG. 3B, the iterative phase process is stopped as seen in operation 160 once convergence is reached. As the iterations proceed, the twin image artifact that is inconsistent from one height to the next is gradually washed away and the estimate of the true complex field persists (i.e., convergence is achieved). Typically eight heights, with vertical separations of ~15 μm between adjacent heights, and 10-20 iterations are used to achieve convergence; nevertheless, fewer than 10 iterations can be used and as few as 3-4 heights can also generate satisfactory results. Once convergence has been reached, the phase-recovered complex field at an object plane is obtained as seen in operation 170. The phase-recovered complex field can be based on one or more recovered lost phase information obtained from the various $z_2$ planes. Each $z_2$ plane is a separate and independent recovery. However, there can be an averaging of the recoveries at multiple or all $z_2$ planes. The phase-recovered complex field can then be used to extract phase or amplitude images of the sample 14 to identify objects 12 therein. Because the phase-recovered complex field is obtained, one can digitally adjust the focus of the sample, thereby providing virtual depth-of-field experience for investigating sample slides. This can be used, for example, by a pathologist to evaluate large FOVs and examine 3D images of biological specimens for diagnosis. It should be noted that the above-noted process of recovering object image phase information may be carried out using one or more processors 32 that execute instructions to recover phase information based on the based on the high-resolution pixel super-resolved hologram at each $z_2$ distance.

Still referring to FIG. 3B, in one aspect of the invention, an optional step (step 180) is applied to apply pseudo-color mapping to generate color images of the sample 14. For example, when the illumination source 20 is a single wavelength, one can still obtain color images of the sample 14. In one aspect, spatial-averaging of color information of an image in the YUV color space is used as described herein. The YUV color space has three channels Y, U and V, where Y represents the luminance (brightness), and U and V represent the chrominance (color). A digital mapping function is used between the luminance (Y) and the color (U and V) channels. The digital mapping function is generated by statistically learning the transformation that exists in a given stain type of interest. In this learning phase, traditional microscope images of the specimens are converted into the YUV color space whereby a pixel-by-pixel scan relates each Y value to its corresponding average U and V values, resulting in a statistical mapping function. Next, this learned mapping is applied to digitally color the single wavelength lens-free reconstructed images of the same stain type, deciding on the missing color values (U and V) of each pixel according to the reconstructed holographic image intensity, which serves as the brightness (Y) channel of the final colored image. The full YUV representation is finally converted to the RGB color space to yield the lens-free color image.

Figure 6A:
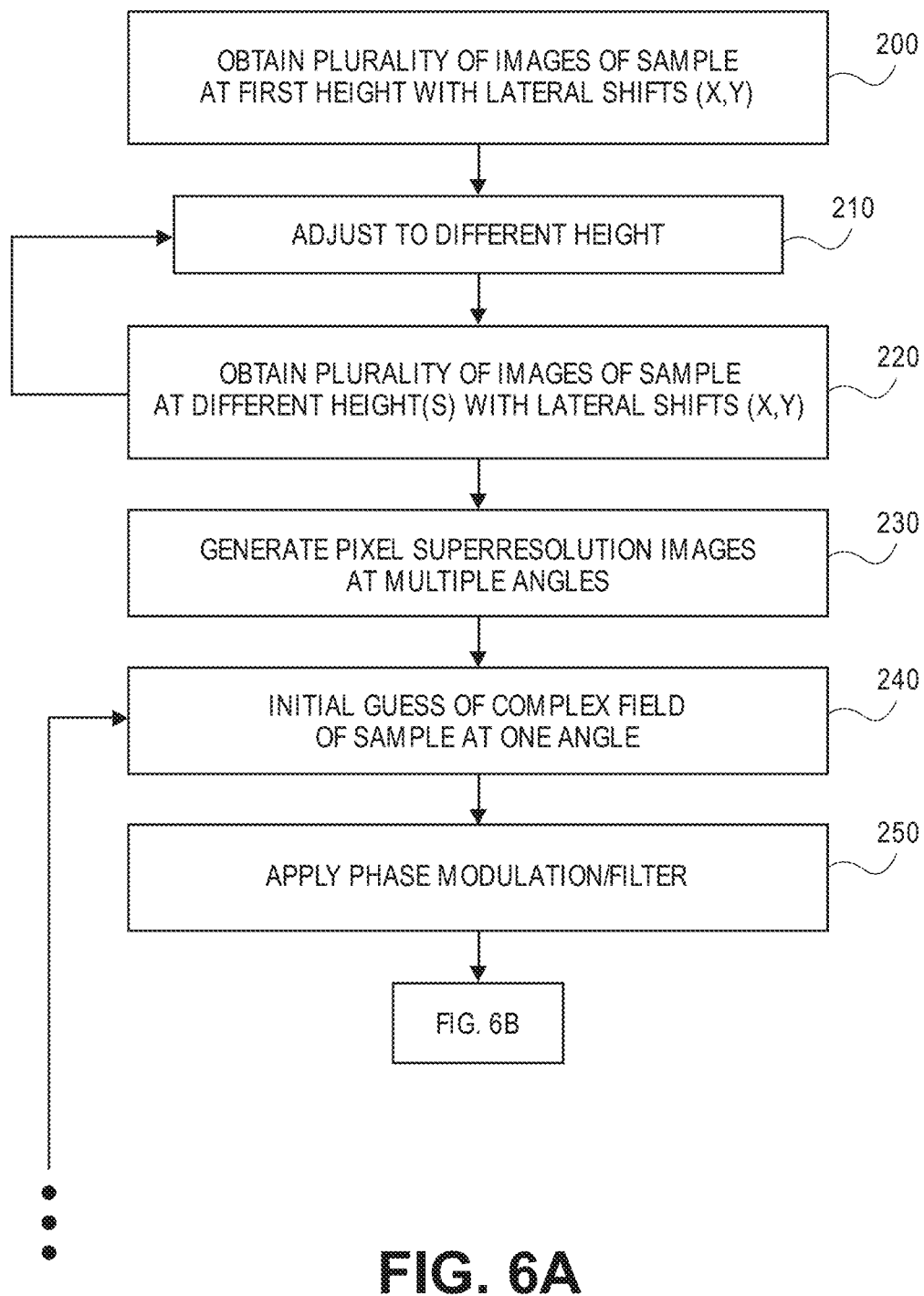
FIG. 6A-B illustrates a flowchart of operations for another embodiment that utilizes the system of FIG. 2A.
Figure 6B:
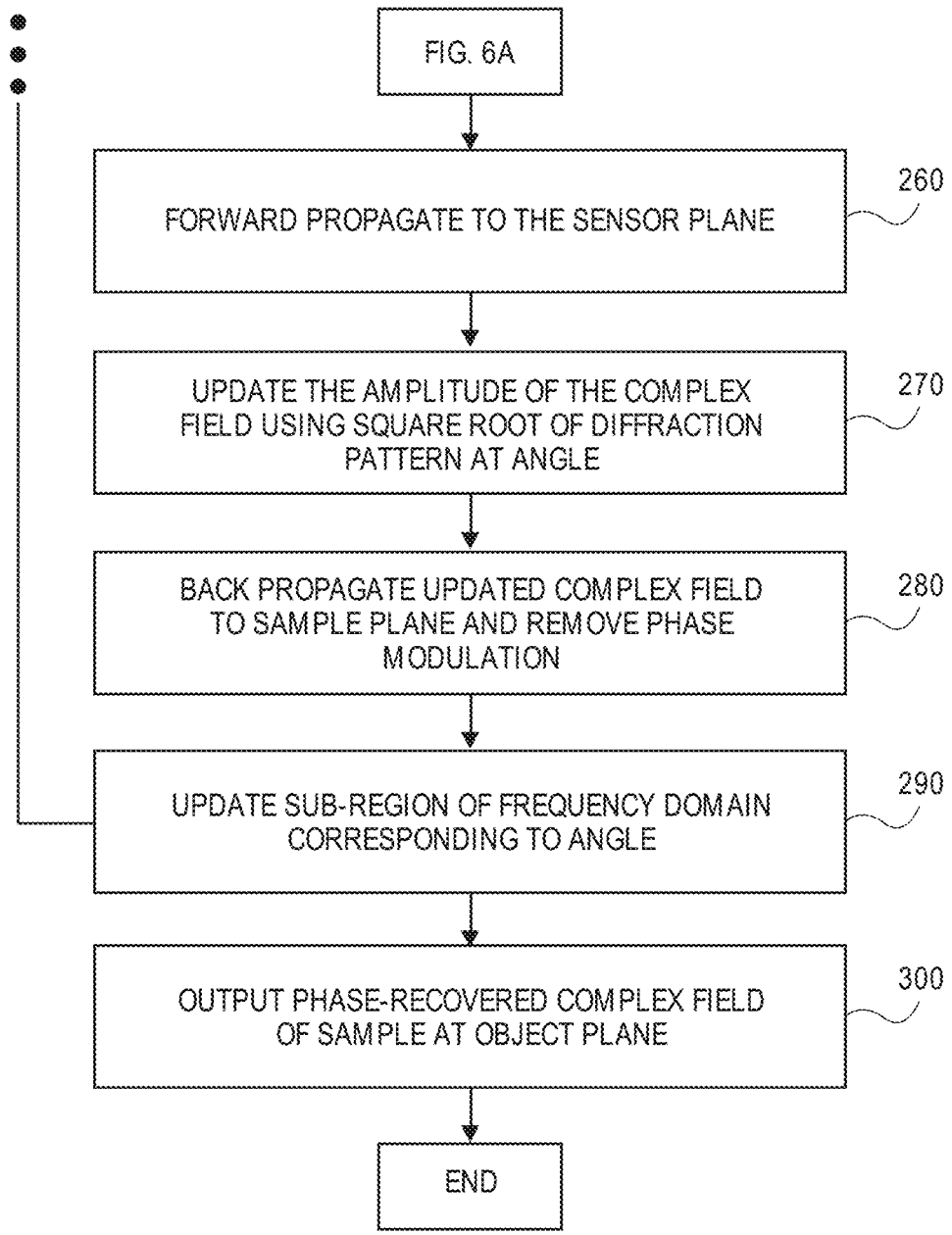

FIGS. 6A and 6B illustrate another embodiment of a method for lens-free imaging of objects using a sensor. This embodiment utilizes the system 10' illustrated in FIG. 2A. In this embodiment, as seen in step 200, a plurality of images of the sample 14 are obtained at a first angle with lateral (x, y) shifts undertaken between images at the first angle. In operation 210, the illumination source 20' is then adjusted to a different angle. As explained herein, the different angle may be achieved by a number of different ways including moving the illumination source 20' or a waveguide attached thereto or switching on one of a plurality of different illumination sources 20' or waveguides oriented at a particular angle. In addition, the sample 14 may be moved relative to the illumination source 20. After adjusting to the different angle, a plurality of images of the sample 14 is obtained at the new angle with the plurality of images taken after lateral (x, y) shifts are performed as seen in step 220. This process of adjusting to a new angle and then obtaining a plurality of images at the new angle continues until a number of different angles have been imaged. Typically this may be less than about 30 angles and more preferably, less than 10 angles. Next, pixel super-resolution images are generated for each of the multiple angles as seen in operation 230. The generation of pixel super-resolution images is performed. During the lens-free image acquisition at each angle, the illumination source 20' is shifted laterally by small amounts (e.g., ~0.1-0.2 mm), and a raw diffraction pattern is sequentially captured at each light source position. Note that these sub-pixel lateral shifts are negligible compared to the source-to-sample distance (e.g., ~7-11 cm), and therefore, the illumination angle remains approximately constant during the pixel super-resolution data acquisition. These sub-pixel shifts allow the synthesis of a high-resolution in-line hologram for each angle using multiple (e.g., 16 to 64) lower-resolution in-line holograms. In the synthesis of the super-resolved holograms, the responsivity distribution within the pixel is also taken into account to compensate for the attenuation of the specimen's high frequency components, as detailed in Greenbaum et al., Increased space-bandwidth product in pixel super-resolved lens-free on-chip microscopy. *Sci Rep* 2013; 3. In a typical lens-free synthetic aperture experiment, images from two orthogonal illumination axes are acquired at 10° increments spanning −50° to +50° although this range may change as well as the incremental angle adjustment.

Still referring to FIG. 6A, in operation 240, an initial guess of the complex field of the sample is made at one angle. This initial guess can be generated by back-propagating the hologram at one of the illumination angles using the angular spectrum approach. Alternatively, the initial guess can be generated by summing the back-propagation results from multiple angles. In the next step (250), phase modulation is applied, which is determined by the illumination angle that is selected. For example, a flat-top filter may be used for the forward-propagation aperture. As seen in FIG. 6B, the initial guess which is a complex field representing the sample 14 is forward-propagated to the sensor plane as seen in operation 260. Next, as seen in operation 270, the amplitude of the complex field is updated using the square root of the diffraction pattern at the particular angle. This may be a weighted operation that uses both the newly forward-propagated field and the measured one (e.g., 60% forward-propagated and 40% measured). In operation 280, the updated complex field is than back propagated to the sample plane and phase modulation is removed. In operation 290, in the frequency domain, a sub-region (i.e., an aperture) is updated corresponding to the particular angle. This updating process may also be weighted between the measured field and the back-propagated field as described above. This process repeats for each angle. Several iteration cycles may be needed to achieve convergence and phase retrieval. Once complete, the phase-recovered complex field of the sample at the object plan is obtained as seen in operation 300. This phase-recovered complex field of the sample can then be used to generate, for example, amplitude or phase based images of the sample. It should be noted that the above-noted process of recovering object image phase information may be carried out using one or more processors 32 that execute instructions to recover phase information based on the high-resolution synthetic aperture hologram that is created by the different illumination angles.

Embodiment #1 ($z_2$ Adjust)

Materials and Methods

Figure 7:
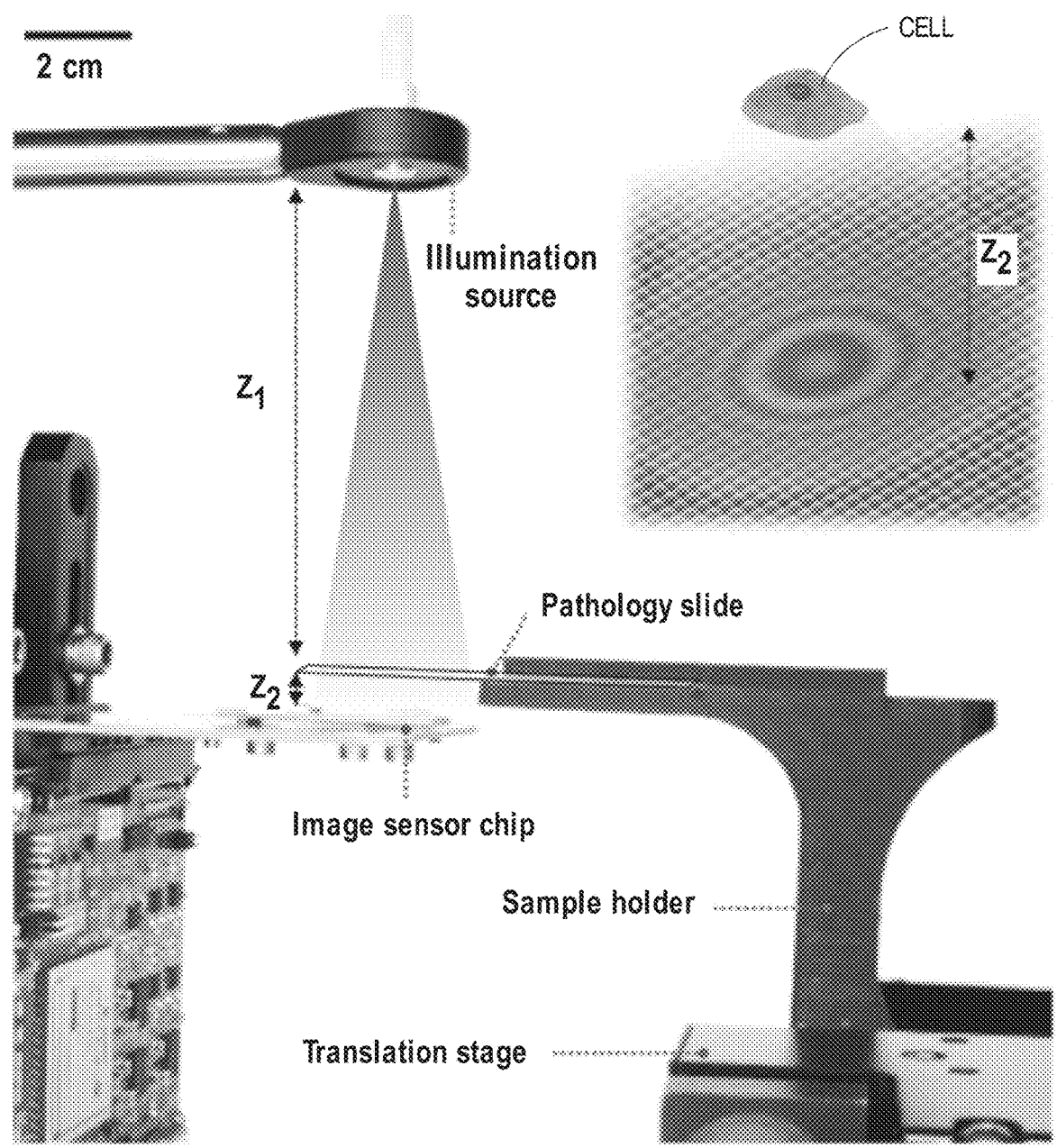
FIG. 7 illustrates an imaging experimental set-up. This set-up contains a partially coherent illumination source, a sample (e.g., a pathology slide) and an image sensor chip. The illumination source is placed a few centimeters away from the pathology slide ($Z_1$ distance), whereas the image sensor is positioned closely underneath the sample ($Z_2$ distance). Therefore instead of recording a direct image of the specimen, an interference pattern is recorded by the image sensor (see inset), which is then reconstructed to reveal 3D images of the specimens.
Figure 8B:
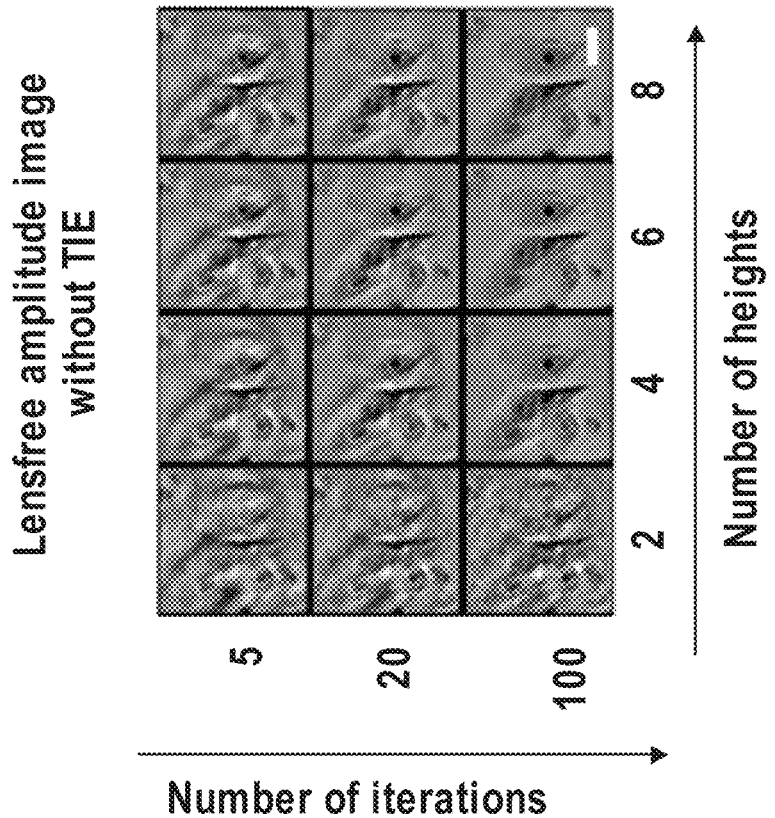
FIG. 8B illustrates reconstructed lens-free amplitude images as function of number of heights and number of iterations.
Figure 8A:
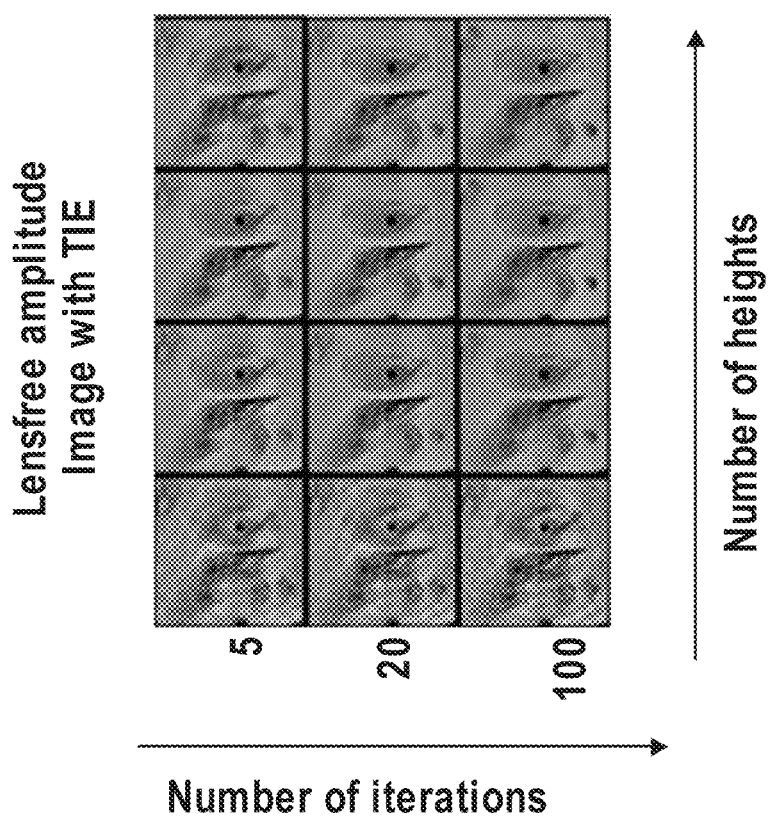
FIG. 8A illustrates reconstructed lens-free amplitude images as function of number of heights and number of iterations.
Figure 8D:
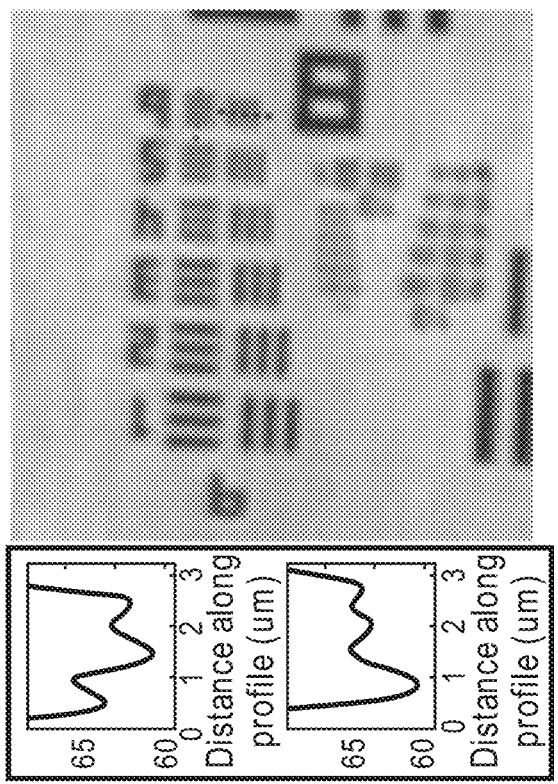
FIGS. 8C and 8D illustrates resolution quantification using extreme USAF test chart with TIE solution (FIG. 8C) and without TIE solution (FIG. 8D) as an initial phase guess for the multi-height phase recovery algorithm, respectively. With a green illumination wavelength ($\lambda$=532 nm), gratings with a line-width of 548 nm (group 9, element 6) are resolved in both cases.
Figure 8C:
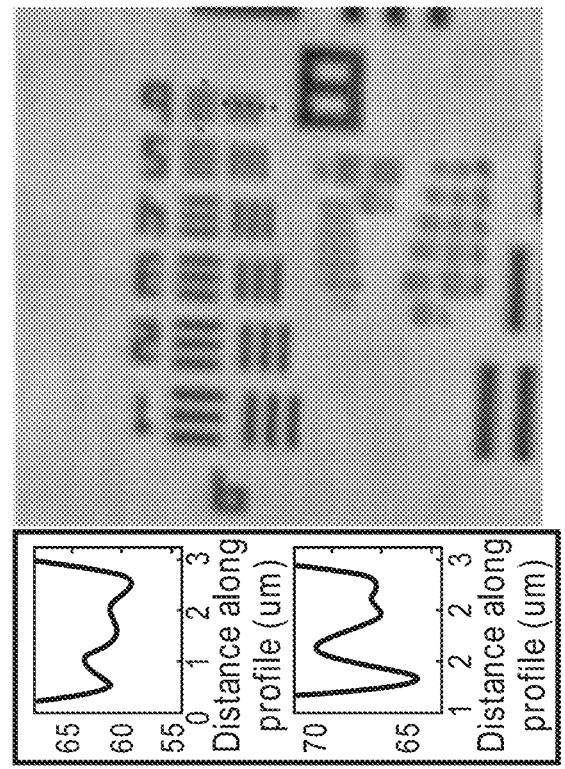

FIG. 7 illustrates the setup of a lens-free on-chip microscope based on multi-height phase retrieval. The microscope is composed of a partially coherent illumination source (Fianium, 2 nm bandwidth), a scanning stage (Thorlabs, NanoMax 606), a CMOS image sensor chip (Sony, IMX081, with 1.12 µm pixel-size), and a computer that controls the set-up (Dell, Optiplex 9010). The pathology slide of interest is mounted on the stage through a 3D printed sample holder, and is illuminated to project an in-line hologram onto the sensor chip, whose intensity is recorded and saved to the computer for digital processing. The distance from the light source to the sample ($z_1$) is 7-20 cm, while the distance from the sample to the image sensor ($z_2$) is 100-800 µm. Due to the fact that $z_1 \gg z_2$, the fringe magnification of the hologram with respect to the object is unit, enabling a sample FOV as large as the active area of the image sensor chip, which is 20.5 mm$^2$ for the CMOS sensor used herein, and can be as large as ~18 cm$^2$ for a CCD image sensor. Instead of using a highly coherent source (e.g., a laser with very narrow bandwidth) that is typically used in holographic imaging, a partially coherent illumination source is adopted to reduce noise due to speckle and multiple-reflection interference. Note also that because of the small distance between the sample and sensor planes, this limited (i.e., partial) temporal coherence of the illumination does not pose a resolution limit for the reconstructed images. The stage is programmed to first apply sub-pixel lateral shifts to the specimen on a 6×6 or 8×8 orthogonal grid, and then move incrementally in the z-direction to reach the next height. This process is repeated for multiple heights (typically eight) generating a 3D stack of lens-free images, which are fed to the image-processing algorithm for pixel super-resolution synthesis and multi-height phase reconstruction.

Back Propagation of Holograms

Although multi-height phase recovery method is implemented to obtain the final reconstructed image, in many circumstances it is also necessary to reconstruct an image from a single hologram. This is achieved by multiplying the hologram with the reference wave, which can be approximated as a plane wave in the imaging geometry previously discussed, and digitally propagating it to the image plane based on the angular spectrum approach (see J. W. Goodman, Introduction to Fourier Optics, 3$^{rd}$, Ed. 2005, which is incorporated by reference herein). The resulting image is accompanied with an error term commonly known as the twin-image artifact. This artifact is inevitably present in all in-line holographic imaging systems due to the loss of the optical phase information during the intensity recording process. Sparse objects that slightly perturb the illumination wavefront are less affected by the twin image noise, whereas dense objects such as connected tissue slides are in general affected to a larger degree. Here, this back propagation computational module serves as a building block in autofocus and phase-recovery algorithms (eliminating the twin image artifact), which will be detailed in the following sub-sections.

Autofocus Algorithm

A digital hologram has a large depth of focus, i.e., it contains volumetric information of the sample, and allows to digitally focus on different objects that reside at different depths. In order to automatically obtain the depth-position ($z_2$ distance) of the object within the sample volume, an autofocus algorithm (FIG. 14A) based on Sobel gradient magnitude is adopted. This method works by finding the peak of a "sharpness" measure, which is defined as the variance of the gradient magnitudes. By using digital back propagation as discussed previously, images at different planes in the imaged volume are obtained, and the "sharpness" measure is calculated for each image (FIG. 14B). The maximum "sharpness" measure corresponds to the correct $z_2$ distance i.e., the axial plane of the object. This method offers a simple way for finding the focus in an automated fashion without the need for any feedback or quantified measurement from the scanning stage or the experimental set-up, which significantly releases the alignment and complexity requirements of the system.

Pixel Super-Resolution

In the experimental set-up, the in-line holograms of specimen are sampled with unit fringe magnification. Consequently, under-sampling due to the finite pixel-size of the image sensor imposes a major limitation on the smallest resolvable feature and the image quality. This finite pixel-size not only limits the highest spatial frequency that is recorded, but also introduces errors due to spatial frequency aliasing. To mitigate this problem, a pixel super-resolution technique is implemented to reduce the effective pixel-size of the image-sensor and prevent sampling errors. By capturing a number of low-resolution holograms at sub-pixel shifts with respect to each other, the number of sample points is increased and the pixel-size is equivalently reduced. Here, to implement the sub-pixel shifts between the lens-free images, the stage was programmed to laterally shift the sample on a 6×6 or 8×8 grid, where in each location a low-resolution in-line hologram was captured. After multiple low-resolution holograms are recorded, these holograms are digitally merged to create a high-resolution pixel super-resolved hologram. In this process, an algorithm is used to automatically obtain accurate estimations of the shifts for the precise synthesis of the high-resolution hologram from the low-resolution holograms—once again, without the need for any feedback or measurement from the scanning stage or the set-up. To this end, an iterative gradient method was used to find the relative shifts between low-resolution holograms with sub-pixel accuracy.

In this process, an algorithm was used to automatically obtain accurate estimations of the shifts for the precise synthesis of the high-resolution hologram from the low-resolution holograms, without the need for any feedback or measurement from the scanning stage or the set-up. More specifically, the sub-pixel shifts between K different low-resolution images were estimated using the iterative gradient based technique. We followed the notation in Hardie et al., High Resolution Image Reconstruction From a Sequence of Rotated and Translated Frames and its Application to an Infrared Imaging System, Opt. Eng. 37(1), 247-260 (1998) (which is incorporated by reference herein), while simplifying the mathematical derivation by neglecting any rotations between the images, which is a valid assumption in this system. The goal of the algorithm is to find the horizontal and vertical shifts ($h_k$ and $V_k$) respectively for the $k^{th}$ blurred low resolution image $õ_k$ relative to a reference image, which we arbitrarily selected to be the first blurred image ($õ_1$). Since the images are similar we can assume that $$\tilde{o}_k(x,y) \approx \tilde{o}_1(x+h_k, y+v_k).$$

By using the Taylor series expansion on the right hand side of the equation we reach $$\tilde{o}_k(x,y) \approx \tilde{o}_1(x,y) + h_k g_x(x,y) + v_k g_y(x,y).$$

Where $$g_x(x,y) = \frac{\partial \tilde{o}_1(x,y)}{\partial x} \text{ and } g_y(x,y) = \frac{\partial \tilde{o}_1(x,y)}{\partial y}.$$

Therefore we can formulate the problem as a minimization problem, when the goal is to find $\hat{h}_k$ and $\hat{v}_k$ that satisfy the following:

$$\hat{h}_k, \hat{v}_k = \underset{h_k, v_k}{\operatorname{argmin}} \sum_{(x,y) \in S} (\tilde{o}_k(x,y) - \tilde{o}_1(x,y) - h_k \hat{g}_x(x,y) - v_k \hat{g}_y(x,y))^2$$

where S represents the support of the object in the $R^2$ space. On a discrete grid, where the horizontal and vertical indexes are $n_1$ and $n_2$ respectively, and every discrete low resolution image $y_k$ has, without loss of generality, M×M pixels, the problem can be written as:

$$\hat{h}_k, \hat{v}_k = \underset{h_k, v_k}{\operatorname{argmin}} \sum_{n \in N} (y_k(n) - y_1(n) - h_k \hat{g}_x(n) - v_k \hat{g}_y(n))^2,$$

where $n=[n_1, n_2]$, N is the image support grid that the observation was acquired and $\hat{g}_x(n)$ and $\hat{g}_y(n)$ are defined as:

$$\hat{g}_x = \begin{pmatrix} -1 & 0 & 1 \\ -1 & 0 & 1 \\ -1 & 0 & 1 \end{pmatrix} \otimes y_1(n); \hat{g}_y = \begin{pmatrix} -1 & -1 & -1 \\ 0 & 0 & 0 \\ 1 & 1 & 1 \end{pmatrix} \otimes y_1(n),$$

where $\otimes$ represents the discrete convolution operation. To solve the minimization problem we differentiate it with respect to $h_k$ and $v_k$, and set the partial derivative to zero. This will result in a set of two equations:

$$\sum_{n \in N} \left( h_k \hat{g}_x^2(n) + v_k \hat{g}_x(n) \hat{g}_y(n) \right) = \sum_{n \in N} (y_k(n) - y_1(n)) \hat{g}_x(n)$$

$$\sum_{n \in N} \left( h_k \hat{g}_x(n) \hat{g}_y(n) + v_k \hat{g}_y^2(n) \right) = \sum_{n \in N} (y_k(n) - y_1(n)) \hat{g}_y(n)$$

We can rearrange these equations in a matrix notation i.e. $MR_k = V_k$, where $R_k = [h_k, v_k]^T$, $$V_k = \begin{bmatrix} \sum_{n \in N} (y_k(n) - y_1(n)) \hat{g}_x(n) \\ \sum_{n \in N} (y_k(n) - y_1(n)) \hat{g}_y(n) \end{bmatrix},$$

and $$M = \begin{bmatrix} \sum_{n \in N} \hat{g}_x^2(n) & \sum_{n \in N} \hat{g}_x(n) \hat{g}_y(n) \\ \sum_{n \in N} \hat{g}_x(n) \hat{g}_y(n) & \sum_{n \in N} \hat{g}_y^2(n) \end{bmatrix}.$$

Therefore $\hat{R}_k = [\hat{h}_k, \hat{v}_k]^T$ can be found by $$\hat{R}_k = M^{-1} V_k.$$

This method works well if the values of $h_k$ and $v_k$ are small. In case $h_k$ and $v_k$ are relatively large this method has to be repeated iteratively when $y_k(n)$ will be resampled according to $\hat{h}_k$ and $\hat{v}_k$ to reduce the values of the vertical and horizontal shifts.

Multi-Height Phase-Retrieval Algorithm

The twin image artifact in in-line holography is due to loss of phase information at the sensor chip and it deteriorates the image quality especially for spatially dense and connected objects such as pathology slides. Hence to image such objects with high quality, a powerful and robust phase-recovery algorithm is needed. For this purpose, an iterative multi-height phase retrieval algorithm was used, which works by assuming an initial phase guess for the complex optical field and propagating it back and forth among different heights, where at each plane the amplitude of the current guess is averaged with the amplitude of the super-resolved hologram (i.e., the measurement), while keeping the current status of the phase. In each iteration, the algorithm starts from the lowest plane to the highest one, processing all the heights in between, and then goes backwards. As the iterations proceed, the twin image artifact that is inconsistent from one height to another is gradually washed away and the estimate of the true complex field persists (i.e., convergence is achieved). Typically eight heights, with vertical separations of ~15 μm between adjacent heights, and 10-20 iterations are used to achieve convergence (convergence may happen in a larger number of iterations, e.g., less than 50); nevertheless, as few as 3-4 heights can also generate satisfactory results.

In this iterative algorithm, which can also be broadly referred to as an "error-reduction algorithm", the initial phase guess of the complex field is important and it would affect the processing time required for convergence. A simple initial guess can be taken using the amplitude of the super-resolved hologram at the lowest height with zero-phase; however a much better guess can be generated using TIE, which analytically computes the initial phase guess based on the measurements from two different heights. Although this calculated phase using TIE is approximate due to the low numerical aperture assumption and the finite distance between the two planes, it serves as a better initial condition that can dramatically reduce the number of iterations necessary for the algorithm to converge as illustrated in FIGS. 8A-8D. Before the iterations begin, super-resolved holograms at different heights must also be digitally registered to each other. In order to align these images accurately, each super-resolved hologram for a given height is back-propagated to one common plane, and these refocused holograms are digitally registered to each other.

Analytical Phase Retrieval Using the Transport of Intensity Equation (TIE)

TIE is an elliptic partial differential equation that relates the phase of an optical field to the z-derivative of the field intensity. Unlike iterative methods, this equation deterministically computes the phase. The TIE performance is typically limited by the low-numerical-aperture assumption, imperfect knowledge of axial derivative of intensity, relatively high susceptibility to noise, and the need for the knowledge of the phase at the perimeter of the aperture, which is usually not available. However, the TIE phase solution is a good initial guess to the multi-height phase recovery algorithm that can accelerate convergence. Here, the intensity derivative along the axial direction is approximated by the differentiation of intensity measurements at two different heights divided by the distance between them. The first height is picked as the lowest one, and the second height is picked among the other heights so that they are separated by approximately 100 μm with respect to each other. The elliptic equation is solved using a finite element method based elliptic equation solver. Due to the fact that the phase at the boundary is difficult to measure in practice, the intensity derivative is tapered gradually to zero at the edges using a Tukey window and assume a zero Dirichlet boundary condition at the edges of the aperture. The output of the equation solver is fed to the multi-height phase retrieval algorithm as the initial guess for the optical phase. To increase the speed of the TIE solver, a faster solution to the TIE can also be generated using a fast Fourier transform based approach, but it is in theory less accurate than the elliptic equation solver due to its periodic assumption of the boundary conditions. Note, however, that this fast Fourier transform based method does not introduce any visible degradation of the reconstructed image quality compared to elliptic equation solver.

Colorization of Lens-Free Holographic Images

In biomedical imaging, color is of great importance and color staining of samples is widely used. One method for coloring of lens-free holographic images involves capturing and reconstructing images at three wavelengths (i.e., red, green and blue) and using them as the RGB channels, respectively, to create a color image. However, this scheme triples the image acquisition and processing time compared to the mono-color case, and also gives rise to a spatial color noise, commonly referred to as the "rainbow" artifact in holographic imaging. An alternative solution that is utilized in this embodiment involves spatial-averaging of only the color information of an image in the YUV color space to alleviate this rainbow artifact. The YUV color space has three channels Y, U and V, where Y represents the luminance (brightness), and U and V represent the chrominance (color). This YUV representation can be created from RGB color space via a simple linear transform. By taking advantage of the separation of the color from the brightness channel in the YUV color space, the rainbow artifact can be mitigated by moving-averaging (or equivalently, low-pass filtering) in the U and V channels without affecting the brightness of the image. Here as seen in FIGS. 9A-9M, the color (U and V) channels are synthesized from back-propagated low-resolution holograms acquired at three wavelengths (blue: 471 nm, green: 532 nm, red: 633 nm) by RGB to YUV conversion; then the high-resolution multi-height reconstructed image is used, acquired at only one wavelength (green, 532 nm) as the Y channel. Next the U and V channels are low-passed filtered spatially with a rectangular window. Finally, the YUV image is converted back to the RGB domain. This process is computationally very efficient as only one high-resolution (i.e., super-resolved) image needs to be reconstructed (at the green wavelength), hence the total reconstruction time is only ~5% longer than that of the mono-color case.

In order to further reduce the computational complexity and relieve the need to capture multi-color holograms, a second colorization method was implemented based on a single mono-color reconstructed image (see FIGS. 10A-10G). In this method, a digital mapping function between luminance (Y) and color (U and V) channels is created by statistically learning the transformation that exists in a given stain type of interest. In the initial learning phase, traditional microscope images of the specimens are converted into the YUV color space, where a pixel-by-pixel scan relates each Y value to its corresponding average U and V values, resulting in a statistical mapping function. Next, this learned mapping is applied to digitally color the single wavelength lens-free reconstructed images of the same stain type, deciding on the missing color values (U and V) of each pixel according to the reconstructed holographic image intensity, which serves as the brightness (Y) channel of the final colored image. The full YUV representation is finally converted to the RGB color space to yield the lens-free color image. In this method, since all the holograms are captured at a single wavelength, the image acquisition time is equal to the mono-color case and there is no need for a multi-wavelength experiment. The initial learning step needs to be carried out only once for a specific stain-tissue combination, and therefore new samples of the same type can be rapidly colored using the same mapping function. Also note that in order for the color mapping to be applied correctly, the range of amplitudes (or intensity values) of the lens-free image needs to be digitally matched to the acquired microscope images, i.e., histogram matching, to increase the coloring similarity between the lens-free and lens-based microscope images, which needs to be performed only once for a given lens-free imaging set-up.

Field Transformations Among Tilted Planes

Rotational transformation of a complex optical field is a computational method that enables the reconstruction of an image on arbitrary tilted planes using the phase information of an optical wave. For example, when trying to image a tilted surface using a bright field microscope, the microscope user has to constantly refocus the microscope at different locations within the FOV; however, if one has access to the complex field information, the entire sample can be digitally focused all at once using rotational transformations. This method is computationally inexpensive as it involves two fast Fourier transforms and a single interpolation step in the Fourier domain. To implement it, and to digitally focus the entire FOV of the lens-free on-chip microscope, the local tilt angles between the image sensor and the sample need to be determined. These local tilt angles are automatically estimated by utilizing the autofocus algorithm at different spatial locations on the sample FOV and finding their absolute heights. One can then fit a local plane to match these heights (see e.g. FIG. 5C), using which the tilt angles can readily be found and a 3D rotation transformation matrix can be built for implementing the needed local field transformation. This interpolation method in the frequency domain was implemented in the programming language C to minimize the processing time.

Multi-Height Phase Recovery with Tilt Correction

To take into account the tilts between the image-sensor and the sample planes the multi-height phase recovery algorithm was modified. First, the tilt angles between different planes are evaluated using the autofocus algorithm as detailed in the earlier sub-section. Second, the multi-height phase recovery process is evoked without tilt correction for ten iterations. The result of this previous step serves as an initial guess for the modified multi-height algorithm. In this modified algorithm (FIG. 5C), the current guess is still propagated among different measured planes, however, after the propagation step the current guess (dashed rectangle) is projected to the tilted image-sensor plane (solid rectangle) using the rotational transformation discussed earlier. The tilted current guess is then registered to the measured hologram. After the registration step, the tilted current guess amplitude is averaged with the measured amplitude, while the phase of the current guess is maintained for the next cycle of iterations. After this step, the current guess is rotated back to a parallel plane (dashed rectangle) and it is digitally propagated to the next measured plane/height until convergence is achieved, which usually takes 10-20 iterations.

Results

Wide FOV Imaging of Invasive Ductal Carcinoma Cells Using Lens-Free On-Chip Microscopy Pathology slides are traditionally stained with Hematoxylin and Eosin (H&E), and the thickness of the section depends on the tissue properties and the pathologist's preference, typically ranging between 2 µm and 7 µm. To demonstrate that lens-free holographic on-chip imaging can properly image connected histology slides, human adenocarcinoma of breast tissue slice was chosen (Carolina, Item #318766) with 7 µm thickness (FIGS. 11A-11J). After holographic reconstruction of the slide, the obtained lens-free images were shown to an expert pathologist to confirm that the image quality was sufficient for medical evaluation. FIG. 11A shows a full FOV reconstruction (FOV=20.5 mm$^2$) of the slide, and to emphasize the wide FOV of lens-free imaging compared to traditional lens-based microscopy, the digital fields-of-view of 40× and 20× microscope objectives are also shown (note that these rectangular FOVs for lens-based digital microscopes are generously estimated, assuming a camera adapter with unit magnification, i.e., these FOV estimates represent upper bounds). Using the lens-free reconstructed images (FIGS. 11B to 11D) the expert pathologist confirmed disorderly epithelial cell proliferation with cribriform growth. The cells exhibit nuclear enlargement, slightly irregular nuclear contours, open chromatin, and moderate delicate cytoplasm. All of these observations made by the pathologist were also in agreement with the 40× microscope objective images (NA=0.75) taken for comparison purposes (FIGS. 11E to 11G). Note that the lens-free image shown in FIG. 3 was acquired using a single illumination wavelength (λ), 532 nm, and that is why it is mono-color. However, as detailed below, a pseudo color mapping can digitally generate lens-free color images.

Pseudo Colored Lens-Free Imaging of Invasive Carcinoma Cells within a Human Breast Section After establishing that lens-free on-chip microscopy provides high-quality clinical images of connected tissue samples over a large FOV, next a human carcinoma of breast section with a thickness of 4 µm (FIGS. 10A-10G) was imaged. Even though the raw lens-free image was captured using only one illumination wavelength, to digitally colorize the reconstructed image, a transformation that maps intensity to color through prior learning statistics was used. FIG. 10A illustrates this pseudo colored lens-free image of carcinoma cells invading a connective tissue region. The cells are arranged in irregular nests within the connective tissue, as illustrated with the dashed rectangles in FIGS. 10B to 10D. Each nest contains cells that exhibit increased nuclear to cytoplasmic ratios, hyperchromasia, irregular nuclear contours, and scant cytoplasm. Moreover the arrows in FIGS. 10B to 10D mark abnormal cells, which are adjacent to benign stromal cells within the connective tissue. All these observations are made by a pathologist examining the lens-free reconstructed color image shown in FIG. 10A.

In addition to using a mathematical transformation to digitally color lens-free holographic images, another colorization technique that can be utilized in imaging of stained pathology samples is based on YUV color space averaging, the results of which will be summarized below.

Lens-Free Color Imaging of a Papanicolaou Smear, Consistent with a High-Grade Squamous Intraepithelial Lesion Cervical cancer screening is another medical application that requires high-throughput and cost-effective imaging solutions. The pathologist or cytotechnologist is required to mechanically scan (using a light microscope) large area Pap smear samples, in search for pre-cancerous cells, which is a tedious, but imperative task. The large FOV of lens-free imaging could assist the pathologist to minimize the mechanical scanning, as its FOV covers substantial area within the entire smear (see FIG. 9A). Moreover, when a suspicious cell is detected, the pathologist typically refocuses the objective lens to different depth slices within the suspicious cell, to better assess the cell's morphology before classifying the cell. Lens-free holographic imaging can address this need since it possesses the ability to digitally focus the sample image to different depths after the image capture. The lens-free imaging results for a normal Pap smear (FIGS. 9B and 9C) and their microscope comparison images (FIGS. 9D and 9E), as well as two different types of abnormal Pap smears that were confirmed by a pathologist using the lens-free images shown in FIG. 9F to 9I (Thin-Prep® preparation). In FIG. 9F, arrows mark a cluster of squamous epithelial cells with nuclear crowding, increased nuclear to cytoplasmic ratios, and slightly irregular nuclear contours. In FIG. 9G to 9I, the arrows mark the cells that show high nuclear to cytoplasmic ratios, irregular nuclear contours, hyperchromasia, and scant cytoplasm. These findings, enabled by the lens-free on-chip microscope images, are consistent with a high-grade squamous intraepithelial lesion. The colorization method used to generate these results is based on YUV color space averaging as detailed herein.

Lens-Free Imaging of Whole Blood Smears

Blood smear is still considered as one of the standard methods to identify immature or abnormal cells that are indicative of various diseases such as anemia, hemoglobin variants and bone marrow disorders. Using the lens-free on-chip microscopy platform normal and abnormal blood smears were imaged as illustrated in FIGS. 12A-12L. FIGS. 12A to 12D show recorded holograms before reconstruction. However random the lens-free holograms may seem, the reconstruction technique is able to transform these holograms to valuable images (FIGS. 12E to 12H) that match very well with lens-based microscope comparison images shown in FIGS. 12I to 12L. In a normal smear (FIGS. 12E and 12F), mature red blood cells have uniform diameters of ~7 µm, they are shaped as a donut (round with an indentation in the middle) and do not have a nucleus. In an abnormal smear taken from a patient with a sickle cell anemia, however, the red blood cells' morphology is clearly different (FIGS. 12G and 12H). Sickle red blood cells (white arrows) and target cells (dark arrows) are observed in FIGS. 12G and 12H. The lens-free microscope resolution also enables the identification and classification of white blood cells that are present in the blood smear (see FIGS. 12E and 12F).

The results demonstrate that lens-free holographic on-chip imaging provides wide FOV 3D images with high-resolution and fidelity that are sufficient for pathology applications. The wide FOV that is digitally recorded in lens-free on-chip microscopy not only provides two orders of magnitude improvement in throughput compared to a lens-based microscope of similar resolution level, but also enables digital focusing of the image plane to different depth sections, a highly desired attribute that is especially important to give the pathologists more degrees of freedom in their examination of the samples since often times different parts of the specimen appear in focus at different depths for large area pathology samples. This 3D imaging performance cannot be achieved using other on-chip microscopes that are based on contact imaging since complex optical fields cannot be retrieved using a contact imaging geometry, which strictly demands the objects to be flat and parallel (with sub-micron gap) with respect to the plane of the sensor chip. In reality, however, pathology samples and other medically relevant biological specimens naturally have 3D features, with uncontrolled modulation of the gap between the sample and sensor planes, both of which create spatial artifacts in contact or shadow imaging. On the other hand, since holographic on-chip microscopy retrieves complex optical fields of the objects, 3D nature of specimen and uncontrolled variations in tilt and height of the specimen can be digitally corrected.

In the reconstruction process to retrieve complex optical fields of dense specimen, the convergence of the iterations depends on the quality of the initial phase guess. Rather than selecting a random initial phase guess, in this work one digitally solves TIE, which provides an analytical solution to the phase of an optical wave from a series of defocused intensity images. Note that the TIE solution is only used for the initial phase guess to the iterative multi-height phase retrieval algorithm, and therefore the images are not affected by the low-resolution Fresnel approximation that is inherent to TIE. Although for relatively sparse and less connected objects TIE solution might not always be needed, for dense and connected objects such as histopathology slides it provides significant convergence advantages. By comparing the reconstructed amplitude images with and without TIE (FIGS. 8A and 8B, respectively), one can clearly see that the use of TIE is very important since either less number of iterations or less number of heights can be used to reconstruct the lens-free image using TIE solution as the initial phase guess. This in turn reduces the computational burden of lens-free imaging without degrading the spatial resolution of the image. To validate that the spatial resolution is not compromised using TIE initial phase, extreme-USAF test chart was imaged (Ready Optics, item #2012B), where the last element of group 9, which corresponds to a grating line-width of 548 nm, was successfully resolved using $\lambda$=532 nm (see FIGS. 8C and 8D).

In addition to its wide FOV and 3D imaging capability, one other advantage of lens-free on-chip imaging is its cost-effectiveness and design simplicity compared to a lens-based pathology microscope. In the current set-up, a mechanical positioning stage was used mainly for two reasons. First, the positioner is used to laterally shift the sample for implementing pixel-super resolution; this function of the stage can be replaced by source shifting using e.g., an array of laser diodes or light-emitting-diodes (LEDs), which is a cost-effective solution for achieving pixel super-resolution. Furthermore, in the reconstructions, an algorithm was used to automatically determine the relative sub-pixel shifts of each lens-free hologram, without the need for a measurement or reading from the scanning system; therefore even a simple and inexpensive mechanical stage would work fine for implementing pixel super-resolution. Second, the mechanical stage is used to modulate and control the sample-to-sensor distance, so that one can capture several defocused interference patterns for the multi-height phase recovery algorithm. However, for this purpose, a simple and inaccurate one-axis translation stage is sufficient since one can digitally estimate the sample to sensor distance as well as uncontrolled tilts of the sample using an autofocus algorithm with ~1 μm precision, without the need for stage readings. In fact, the multi-height phase recovery algorithm was modified to digitally compensate for these uncontrolled tilts and variations in sample to sensor distances along the FOV, which permits the use of a low-cost 1D translation stage.

The challenge of using a low-end axial translation stage, e.g., with a cost of ~$10-$20 is that each recorded hologram at a given height exhibits a different tilt between the axially translated sensor-chip and the sample plane. These uncontrolled tilts result in distortions that are apparent in the reconstructed images as can be seen in FIGS. 13A to 13H. To digitally mitigate these distortions (after image capture), a rotational field transformation technique was used, which is a computational method that can reconstruct a complex image on any arbitrarily tilted plane. FIG. 5C depicts the inclusion of this rotational transformation in the multi-height phase-recovery algorithm, where the current guess of each iteration (dashed rectangle) is projected onto the image sensor plane (solid rectangle) to enforce the measured intensity, while retaining the phase. This tilt correction step in the forward model of the algorithm is needed in order to reconstruct the phase of the optical wave. To test the robustness of this algorithm, five interference patterns were recorded using five highly tilted planes, mimicking a poorly designed experimental set-up that is even worse than the performance of a typical inexpensive 1D translation stage. Without the tilt correction, the reconstructed images are severely distorted (see FIGS. 13A to 13D), in contrast with the lens-free images shown in FIGS. 13E to 13H, which used the tilt correction process as detailed in FIG. 5C. Therefore, this computational tilt correction and sample height estimation approach enables cost-effective implementations of lens-free on-chip microscopy, digitally eliminating the need for expensive scanning hardware.

All the pathology slides reported in this embodiment that are reconstructed in 3D were processed using 288 raw lens-free images (36 holograms per height to perform pixel super-resolution, and 8 heights to perform multi-height phase recovery), which translate into image acquisition times that are on the order of several seconds using the maximum frame rate of the opto-electronic image sensor chip (15 frames per second). This image acquisition time can be significantly improved using faster CMOS imager chips and/or pulsing of illumination source(s); however, for pathology applications, the current image acquisition times do not form a limiting factor since the pathology slides are fixed. In terms of the image reconstruction time, using MATLAB® and eight measurement heights, the entire processing time of a 1 mm×1 mm sub-FOV took about nine minutes (~539 seconds) using a single desktop computer (Dell T3600, 16 GB RAM memory and Intel Xeon processor ES-1620). Since all the reconstruction steps can be processed in parallel for different sub-FOVs, using a cluster of 20 nodes (e.g., 2 quad-core machines), the entire FOV reconstruction can be performed within 10 minutes. This processing time can be further improved by using: (i) a cluster of Graphics Processing Units (GPUs) instead of Central Processing Units (CPUs), such that the total reconstruction time can be improved by an additional factor of 10-20 fold as the algorithms heavily rely on fast Fourier transforms; and (ii) optimized algorithms running on more efficient software languages such as C/C++. Therefore, even with a single desktop computer using GPUs, the processing time for full FOV reconstructions can be reduced to less than a few minutes.

Another important topic of interest that needs to be discussed is the coherence of illumination, both spatially and temporally. For contact on-chip microscopy, since the ideal gap between the sample and sensor planes is sub-micron, one can initially assume that the coherence of the source is of secondary importance. However, coherence properties of the source still introduce spatial artifacts in contact imaging due to optical diffraction that occurs between the sample and sensor planes. This unavoidable artifact is especially more pronounced for non-planar objects and sub-micron features of the specimen, imaged using contact on-chip microscopy. On the other hand, for lens-free holographic on-chip microscopy, partial coherence of the source is engineered and utilized in our favor to retrieve high resolution complex fields of the specimen to digitally reverse optical diffraction so that the vertical gap between the sample and sensor planes can be significantly larger compared to contact imaging, and it can also spatially vary within the sample FOV, without introducing spatial artifacts. For this performance, the spatial coherence diameter at the sensor plane was engineered to be >4 mm and temporal coherence length to be ~0.1 mm, permitting high-resolution imaging of connected tissue slides over >20 $mm^2$ FOV with significantly reduced speckle and multiple reflection interference noise terms.

This 3D imaging capability using lens-free on-chip imaging is a landmark result for automated digital imaging of pathology slides even in resource limited clinical settings, where e.g., the patient-to-doctor ratio is much larger than 1,000. It not only creates a cost-effective telemedicine tool by enabling the medical professionals to remotely seek for a second opinion, but can also provide the diagnosing pathologist a documentation tool, which could protect the pathologist in the case of medical malpractice lawsuit, or to serve as a training resource for prospect pathologists.

Embodiment #2 (Synthetic Aperture)

Materials and Methods

In this embodiment, which is termed "LISA" (Lens-free Imaging using Synthetic Aperture), at each hologram recording process using an oblique illumination angle, some of the higher spatial frequencies that are normally attenuated or missed by the sensor chip are shifted to the lower spatial frequencies where the response of the pixels is significantly improved. This frequency shifting process due to angular diversity in illumination could also enable some of the evanescent waves that would normally never reach the sensor chip to be converted to travelling waves, permitting the digital synthesis of an NA that is larger than the refractive index of air.

In the setup illustrated in FIG. 2A, a broadband light source (Fianium, WhiteLase-Micro) is filtered using an acousto-optic tunable filter (AOTF), and then coupled into a single mode optical fiber to provide partially coherent and tunable illumination of the specimen. Spectral bandwidth of the light coming out of the fiber is about 2.5 nm and the power of the illumination is ~20 µW. The illumination fiber is mounted on a rotational arm whose axis of rotation is aligned within the plane of the image sensor chip (1.12 µm pixel-pitch CMOS color sensor from Sony Corp). The distance between the fiber end and the image sensor is ~7-11 cm. The rotational arm is installed on a set of linear stages, which provide lateral light source shift that is used for pixel super resolution. The CMOS image sensor is also installed on a rotation mount so that the sensor can be rotated within a lateral plane. During the data acquisition process, source-shift, angle tilt and image acquisition are all automated and coordinated by a custom-written LabVIEW software.

Pixel Super Resolution

To digitally mitigate under-sampling artifacts and consequently improve LISA's spatial resolution, pixel super resolution is implemented. During lens-free image acquisition at each angle, the light source is shifted laterally by small amounts (e.g., ~0.1-0.2 mm) and a raw diffraction pattern is sequentially captured at each light source position. Note that these sub-pixel lateral shifts are negligible compared to the source-to-sample distance (e.g., ~7-11 cm), and therefore the illumination angle approximately remains constant during the pixel super resolution data acquisition. These sub-pixel shifts allow us to synthesize a high-resolution in-line hologram for each angle using multiple (typically 16 to 64) lower-resolution in-line holograms. In the synthesis of the super-resolved holograms, responsivity distribution within the pixel is also taken into account to compensate for the attenuation of the specimen's high frequency components. In a typical lens-free synthetic aperture experiment, images from two orthogonal illumination axes are acquired, with 10° increments spanning −50° to +50°.

Autofocus Algorithm

An autofocus algorithm is implemented to digitally estimate the sample to sensor distance as well as the illumination angle, which will be detailed in the next sub-section. For sample to sensor distance estimation, the super-resolved hologram from the lowest illumination angle is back-propagated to different planes; in each plane the algorithm evaluates the sharpness of the resulting image, which is defined as the variance of the gradient of the image, calculated using Sobel operators as explained previously in embodiment #1. The plane with the highest sharpness is selected as the object plane.

Computational Calibration of Illumination Angle

In the setup, a rotation arm is used to vary the illumination angle. This rotation arm is inaccurate and can cause up to 4° discrepancies between experiments. Nevertheless, the iterative synthetic aperture and phase retrieval algorithm requires accurate angle information as such errors would result in loss of spatial resolution and phase convergence problems. Toward this end, a three-step computational method was devices to automatically calibrate the illumination angles. First, the sample to sensor distance is evaluated using an autofocus algorithm as detailed in the previous sub-section. For this purpose a hologram, which is captured approximately at normal illumination angle, is utilized. Second, given the calculated sample-to-sensor distance, an "angular autofocus algorithm" is used to accurately find the illumination angle that is associated with one of the measurements. This algorithm receives one super-resolved hologram as input, which is captured with an oblique illumination angle, and an initial guess for the illumination angle based on the rotational arm position. Then the algorithm back propagates the hologram while scanning the illumination angles with 0.1° increments spanning −4° to +4°, around the initial illumination angle estimate. The algorithm calculates the edge sharpness measure for each resulting image, and the angle that corresponds to the maximum sharpness is selected to be the correct illumination angle for this hologram. After finding the absolute illumination angle for one hologram (i.e., the "anchor" hologram), the rest of the illumination angles can be found by finding the relative shifts of the rest of the super-resolved holograms compared to the "anchor" hologram.

Iterative Synthetic Abased Phase Recovery

Figure 6C:
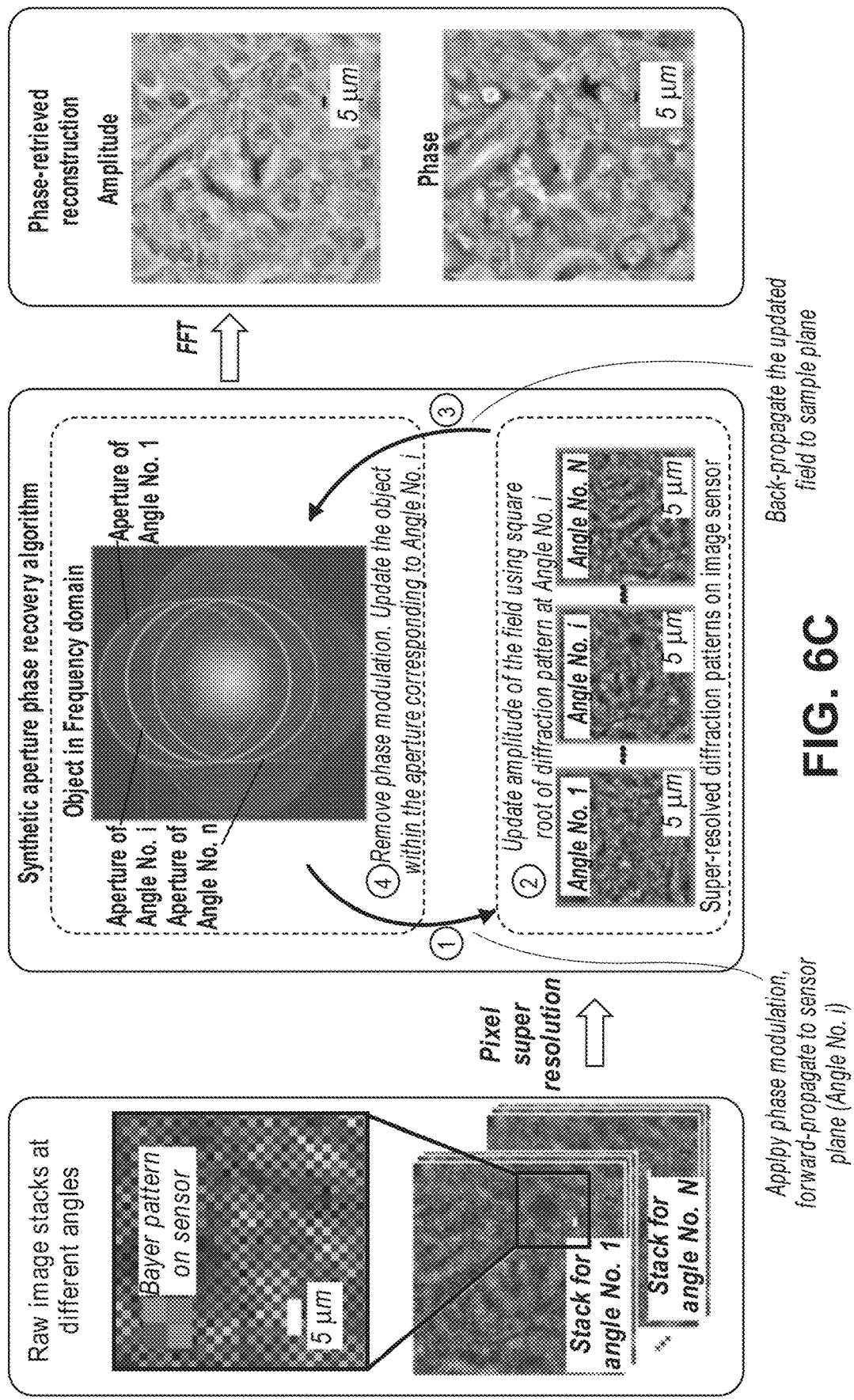
FIG. 6C illustrates a reconstruction algorithm of lens-free on-chip imaging using the synthetic aperture approach. The pixel super-resolution algorithm uses lens-free lower-resolution images (left column) captured at different illumination angles (No. 1 through No. N) to synthesize pixel super-resolved in-line holograms. Middle: a four-step iterative process for synthetic aperture and phase retrieval, which is repeated for all the illumination angles. As an example, for a human breast tissue sample, the reconstruction of the complex sample field can be obtained (right column) after 5-10 cycles using 22 different illumination angles (−50° to 50° at 10° increments along two orthogonal axes). Amplitude and phase images are illustrated.

The iterative phase recovery process (FIGS. 6A and 6B) enables the reconstruction of connected and dense specimen by reconstructing the phase of the optical wave. The algorithm receives as input N pixel super resolved holograms that are synthesized from N different illumination angles, and an initial guess of the specimen. This initial guess can be generated by simply back-propagating the hologram at one of the illumination angles using the angular spectrum approach. Alternatively, the initial guess can also be generated by summing the back-propagation results from multiple angles. Then, a four-step iterative process is carried out to perform synthetic aperture based phase retrieval (see FIG. 6C). First, the initial guess, i.e., a complex field representing the specimen is forward propagated to the sensor plane. Before the propagation, a phase modulation is applied, which is determined by the illumination angle that is selected. Due to the lens-free and unit magnification configuration, one can use a flat-top filter as the forward propagation aperture. Second, the amplitude of the forward-propagated field is updated using the square root of the diffraction pattern, which was measured at this angle (updated using a weighted average: ~60% of the newly forward-propagated field and ~40% of the measured one). Third, the updated field on sensor plane is back-propagated to the sample plane and the phase modulation is removed. Fourth, in the frequency domain, a sub-region, i.e., an aperture is updated (also weighted average as detailed above) using the back-propagated complex field from step three. The center of this aperture is determined by the illumination angle, and the boundary of this aperture is defined where the signal attenuation equals 3 dB. In the setup, typically 22 angles (e.g., −50° to 50° with 10° increments along two orthogonal axes) and 5 iteration cycles are utilized to achieve phase retrieval. The entire reconstruction algorithm, including pixel super resolution and synthetic aperture phase retrieval, is implemented using MATLAB on a 3.60 GHz CPU computer (Intel Xeon ES-1620, 16 GB RAM). For a 1×1 mm sub-region, the reconstruction time is 46 minutes; 21 minutes are required to super resolve 22 angles with 64 low-resolution images per angle, while 25 minutes are required to complete 5 iteration cycles of the phase recovery algorithm. During the reconstruction process neither GPUs nor parallel computing were used. This reconstruction time could be considerably reduced, by a factor of for example ~20, simply by implementing the algorithm using C language on GPUs.

Digital Colorization of Lens-Free On-Chip Images

Lens-free amplitude images reconstructed at three wavelengths (470 nm, 532 nm and 632 nm) are converted into intensity maps and then combined to form lens-free color (RGB) images of the sample. During this process, histogram equalization is applied to each individual color channel. Such equalization imposes a monotonic, global intensity transformation to the reconstructed intensity map so that the resulted color images agree with visual inspection of the same sample using conventional lens-based microscopy tools. This intensity transformation can be obtained by minimizing the overall difference between the histograms of the reconstructed image and conventional microscope images within several sub-regions of the sample FOV. Once the transformations for all color channels are obtained, they can be applied to other regions or samples as long as the same illumination conditions apply.

Figure 15:
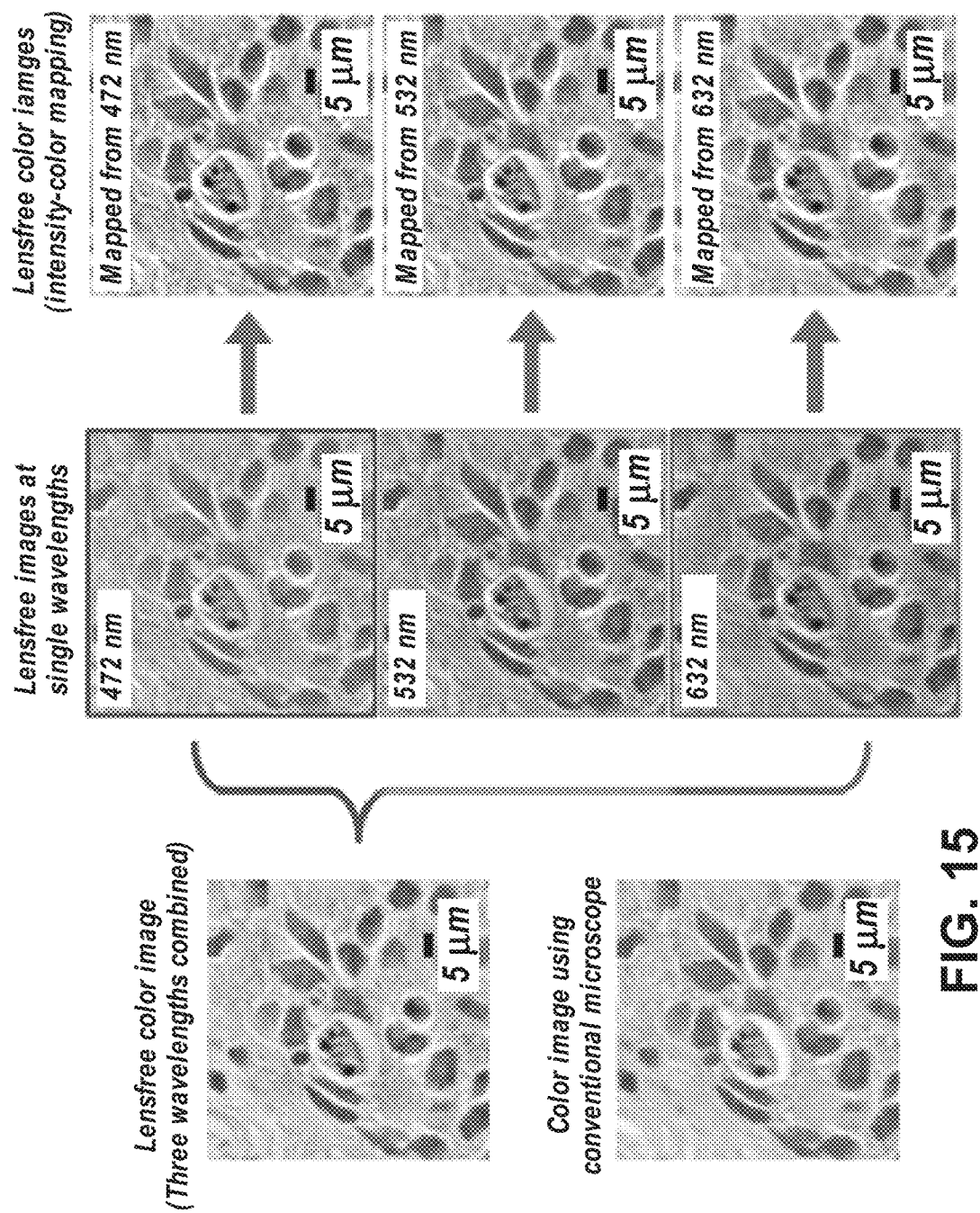
FIG. 15 illustrates colorization methods of LISA images. Top left column: lens-free color (RGB) image generated by combining the reconstructions from three wavelengths. Bottom left column: image of the same sample taken by a conventional lens-based microscope (40× objective, NA=0.75). Center column: lens-free mono-color reconstructions at three different illumination wavelengths ($\lambda$=472 nm, 532 nm and 632 nm). Right column: lens-free color images generated by colorizing (using intensity for color mapping) a single gray scale image obtained using a single illumination wavelength. The specimen is a human breast cancer pathology slide.

Another method to create a color image is to digitally colorize a lens-free image that was reconstructed from only one illumination wavelength. This second colorization method maps intensity to color based on prior knowledge about the imaged sample (see e.g., FIG. 15). This colorization method works in the YUV color space, which contains three channels, the Y channel, which measures luma (brightness), and U and V channels, which measure chrominance (color). The YUV color space can be converted to the RGB representation by a linear transformation. To map a mono-color image into a color image, the amplitude (or intensity) of the mono-color lens-free image is used as the Y channel, while the U and V channels can be inferred from the Y channel. The mapping is created by statistically learning a number of bright field microscope color images of the same type of specimen that are also imaged by the lens-free on-chip microscope. In this training stage, the microscope images are transformed to the YUV color space, and then a pixel-by-pixel scan links each Y value to its corresponding average U and V values, yielding a nonlinear mapping. Before applying the mapping to the monocolor lens-free image, the brightness values of important features such as the nuclei and the extra-cellular matrix must be matched between the learning statistics and the to-be-colored gray scale image. This can either be done by manually picking features of interest, or by matching histograms. It should be emphasized that this learning step needs to be executed only once for each sample type of interest.

Digital Phase Contrast In Lens-Free On-Chip Imaging

Once the complex field of the sample is obtained after phase retrieval steps, a phase shift of $\pi/2$ is digitally applied to its zero-frequency (i.e., DC) component. Then the intensity of this modified complex object field is calculated to create a digital phase contrast image of the specimen (see e.g., FIGS. 16A-16G).

Sample Preparation Steps

The grating lines (FIGS. 17C and 17D) used for NA and resolution quantification are fabricated on a glass substrate using focused ion beam milling. Anonymized biological samples (human breast cancer tissue) were purchased from the Translational Pathology Core Laboratory (TPCL) at UCLA. Unstained Papanicolaou (Pap) smears are prepared through ThinPrep® preparation. All of these pathology slides are sealed in between two glass slides. The gap between the sensor and glass slides is filled with refractive index matching oil (n=1.52). Sample to sensor distances are: 101 µm for grating lines; ~255 µm for breast cancer tissue slides, and ~350 µm for Pap smear slides.

Results

To demonstrate the NA improvement brought by LISA, 250 nm grating lines are imaged under 700 nm illumination wavelength using the unit magnification on-chip imaging set-up shown in FIG. 2A. As detailed in FIG. 6C, spatial sampling limitation of the sensor chip due to its 1.12 µm physical pixel pitch and unit magnification is mitigated by using source-shifting based pixel super resolution, which achieves an effective pixel size of 100-150 nm. The remaining major limitation on spatial resolution is the loss of SNR for high spatial frequencies, which can be addressed by the synthetic aperture approach that has been taken. In the frequency domain, this loss of high spatial frequency information forms a low-pass filter function (FIG. 17A). Tilting the illumination angle shifts the passband of the imaging system to a new sub-region, allowing higher spatial frequencies to be detected by the image sensor (FIG. 17B). By digitally combining the lens-free holographic measurements obtained at different illumination angles (see FIGS. 6A-6C), one obtains the 2D image of the object (FIG. 17D) with a significantly broadened spatial bandwidth as shown in FIG. 17B. FIG. 17D illustrates the lens-free reconstruction results based on this synthetic aperture approach, clearly resolving 250 nm grating lines under 700 nm illumination wavelength, which effectively corresponds to an NA of 1.4, i.e., 700 nm/(2×250 nm), much larger compared to earlier on-chip imaging results that used similar sensor chips. Because resolution and FOV are decoupled in the on-chip imaging set-up (FIG. 2A), this large numerical aperture also comes with an ultra large FOV that is equal to 20.5 mm$^2$, which constitutes the active area of the sensor chip.

Figure 18:
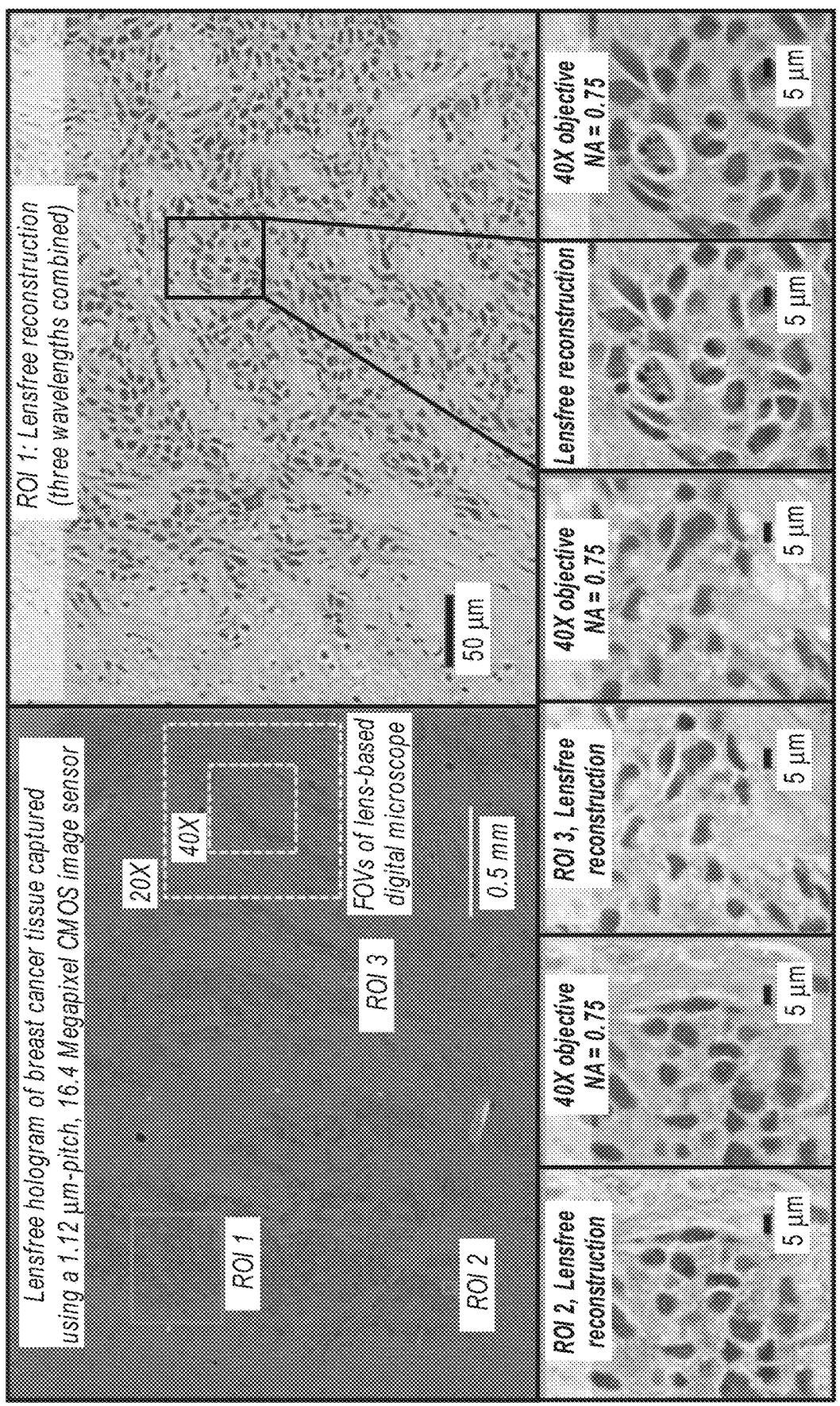
FIG. 18 illustrates lens-free color imaging of breast cancer tissue (H&E staining) using LISA. Top left: sub-region of a lens-free hologram captured by a CMOS sensor chip; FOVs of 20× and 40× microscope objective lenses are also shown for comparison (dashed squares). Top right: lens-free reconstruction of region of interest (ROI) No. 1. Bottom: zoomed images of lens-free reconstructions of various regions within the large reconstructed FOV. Conventional microscope images (40× objective, NA=0.75) are also provided for comparison. To create the lens-free color image, on-chip holographic images at three different illumination wavelengths were used ($\lambda$=472 nm, 532 nm, 632 nm). The sample-to-sensor distance is ~255 μm.

Next, to demonstrate the significantly improved phase recovery performance of LISA as well as its accurate color rendering capability, connected tissue samples were imaged (i.e., H&E stained breast cancer tissue) over a wide FOV as illustrated in FIG. 18. During the image acquisition process, these pathology samples were sequentially imaged at three distinct wavelengths (472 nm, 532 nm and 632 nm) to digitally generate a lens-free color (i.e., RGB) image of the specimen. LISA's color images (see FIG. 18) show a very good agreement with 40× microscope objective images of the same specimen. To boost the data acquisition speed, it was demonstrated that lens-free color imaging capability can also be achieved by transforming the intensity channel of a holographically reconstructed image that is acquired at a single wavelength into a pseudo-color image (see FIG. 15). This intensity-to-color transformation, as successfully demonstrated in FIG. 15, can be statistically established and fine-tuned based on prior knowledge of the sample type as well as the stain choice of interest, and can provide a rapid solution for digital colorization of lens-free holographic images without the need for performing multi-wavelength illumination of the specimen.

To demonstrate label-free imaging capabilities of LISA, unstained Papanicolaou smear slides were imaged as illustrated in FIGS. 16A-16G. Imaging this type of transparent and unlabeled samples usually requires adding a special objective-lens and/or illumination module to a conventional microscope, to convert optical path differences into brightness variations. With LISA, no additional components or modification in the reconstruction algorithm are needed since LISA inherently reconstructs both amplitude and phase information of the specimen. In addition to directly visualizing the phase image of the specimen as illustrated in FIGS. 16B and 16E, one can also digitally replicate the physical image formation process of a phase contrast microscope; for example a phase shift of $\pi/2$ can be added to the zero frequency component of the complex field, and the intensity of this new field mimics a phase contrast image as can be seen in FIGS. 16C and 16F. These lens-free images provide decent agreement to the images of same sample taken by an actual phase contrast microscope using a 40× (NA=0.75) objective lens as seen in FIGS. 16D and 16G.

In lens-free on-chip microscopy the characteristic signature is unit magnification, where FOV and resolution are decoupled, setting the active area of the sensor array as the sample FOV. While these features are highly desirable for creating high-throughput and compact microscopy systems, they also create two major problems both of which are related to the pixels of the sensor array: first, spatial undersampling due to large pixel size (e.g., 1-2 μm); and second, poor SNR and aberrations that are experienced by high spatial frequencies, due to narrow pixel acceptance angle and opto-electronic hardware in front of the active region of the pixels. Pixel super resolution approaches mitigate the first challenge due to large pixel size by e.g., source shifting, which creates sub-pixel shifted replicas of the diffraction patterns of the samples on the sensor array, and these can be utilized to digitally divide each pixel into smaller effective pixels, undoing the effects of spatial undersampling. For implementing pixel super resolution, LISA uses very small angular modulation of the source (<0.5° in the setup) since a small shift of the source is sufficient to generate a sub-pixel shift of the in-line hologram at the sensor plane. On the other hand, shadow imaging based on-chip microscopes demand very large illumination angles (e.g., ±60°) to be scanned to perform pixel super-resolution, since their sample to sensor distance needs to be sub-micron for acceptable spatial resolution. Stated differently, shadow based on-chip microscopy utilizes angular diversity of the illumination entirely for pixel super resolution, whereas LISA uses a much smaller angular range)(<0.5° for performing pixel super-resolution and leaves the rest of the angular space in illumination to increase the effective NA using synthetic aperture. This synthetic aperture approach is essential to mitigate pixel related aberrations and signal loss that high spatial frequencies inevitably experience in an on-chip microscope design, the effects of which become even worse at longer illumination wavelengths since the diffraction angles of a given band of high spatial frequencies increase with wavelength. Such an improvement in NA brought by LISA is critical for maintaining a competitive resolution especially at longer wavelengths, which paves the way for high resolution on-chip microscopy across the entire visible spectrum.

In addition to a significant NA increase, LISA also has a very important advantage for performing robust phase recovery, even for dense and connected tissue samples that have been difficult to reconstruct using transmission based in-line holographic methods. The success of this phase recovery performance of LISA relies on significant increase of SNR in spatial frequency detection, which is achieved through the iterative synthetic aperture approach and is illustrated using pathology samples presented in FIGS. 15, 16A-16C, 16E, 16F, and 18. It should be emphasized that this complex wave retrieval step also enables us to digitally 'focus' onto the sample plane, without the need for a priori knowledge about the sample to sensor distance. As a comparison, precise depth focusing during the imaging process is crucial for lens-based systems, especially when high-NA lenses are used, and mechanical implementation of precise auto-focusing during the scanning process can dramatically increase the complexity and cost of the imaging set-up. Moreover, for transparent samples such as unlabeled biological tissue, focusing is practically difficult using conventional microscopes unless costly additional optical components are added into the imaging system. LISA replaces such laborious processes with automated sample-to-sensor distance search and angle calibration algorithms, which enable autofocusing of the complex optical wave to the sample plane during the reconstruction process. Stated differently, local fluctuations of the vertical gap between the sample and sensor planes across the large imaging FOV are digitally tolerated in LISA, which is another major advantage over shadow based on-chip microscopy. Shadow based imaging demands the same vertical gap to be sub-micron across the entire FOV, which is rather difficult to satisfy in real samples. Placing the specimen directly in contact with the sensor chip surface can partially mitigate such height/depth variations for perfectly planar 2D objects. However, this contact on-chip imaging approach comes with the risk of either significant heating of the sample or damaging the sensor due to extreme proximity to the active region of the chip, and more importantly will inevitably demand very large illumination angles to perform pixel super resolution. These large illumination angles unfortunately introduce major spatial artifacts for shadow/contact imaging since at high illumination angles the shadow of the specimen cannot be considered as a shifted version of the same object function, which forms the basic assumption of pixel super resolution. Using synthetic aperture enabled robust phase recovery, LISA mitigates these auto-focusing challenges and related spatial artifacts while maintaining a simple, cost-effective and unit magnification imaging design.

Once the high resolution complex field of the sample is recovered, various visualization methods are at the users' disposal such as multi-wavelength based colorization, intensity-based color mapping and digital phase contrast techniques. Compared with the intuitive way of combining reconstructions at multiple wavelengths (e.g., red, green, blue) to digitally form a color image of the sample, intensity-based color mapping/transformation takes advantage of the prior knowledge about the sample type and staining method to transform a lens-free mono-color intensity image into a color image (see FIG. 15). While such an approach could greatly reduce the data acquisition and reconstruction time, for an unknown sample of interest without prior information about staining, lens-free colorization using the red, green and blue channels, as illustrated in FIG. 18, would be the choice in general.

For imaging of transparent and colorless samples, instead of physically adding optical components to obtain phase contrast images, one can apply a digital phase shift to the zero frequency component of the holographically reconstructed complex object to mimic the physical image formation in phase contrast microscopy, and the intensity of this phase-shifted field serves as the phase contrast image of the sample. Such images can be especially appealing for unstained pathology samples (see e.g., FIGS. 16C and 16F) as they visualize and enhance the contrast of the spatial features which are practically difficult to observe under regular bright field microscopes.

Although the LISA system includes mechanical components such as linear stages to perform source-shifting based pixel-super resolution and a rotational arm to vary the illumination angle, the implementation of the optical setup can be simplified further and made without any moving components. As demonstrated earlier, source shifting can be performed by sequentially lighting up fibers within a bundle that are individually butt-coupled to light emitting diodes (LEDs). Furthermore, as a result of the wide passband in the frequency domain (i.e., 2.0~3.2 µm−1 in diameter), the number of illumination angles can also be reduced to e.g. ~20 angles, further simplifying the optical set-up. Since the angle calibration is carried out during the numerical reconstruction process, precise alignment of the LISA set-up and illumination sources is not required, making the system robust even for mobile applications.

Being a computational imaging technique, LISA not only benefits from the rapid evolution in image sensor technology but also the advances in computing power; both the image sensor pixel count and CPU transistor count have exhibited exponential increases in the past decade and such advances would provide immediate improvements to the performance of LISA in terms of larger space-bandwidth products and faster reconstructions. Parallel-computing platforms such as graphics processing units (GPUs) and computer clusters could also significantly increase the reconstruction speed of LISA as the entire reconstruction algorithm is highly parallelizable. For instance, the full FOV (~20.5 mm$^2$) image reconstruction can be digitally divided into sub-regions for parallel processing and for each sub-region, pixel super resolution can be individually performed for different illumination angles. The phase retrieval algorithm extensively relies on fast Fourier transform (FFT) operations, which can also be significantly accelerated by using GPUs. In its current implementation, without parallel computing or GPU use, the entire image reconstruction (including pixel super resolution and phase retrieval) for a 1×1 mm sub-region takes ~46 minutes on a single desktop computer (Intel Xeon E5-1620) using MATLAB. This leaves a large room for speed improvement in the reconstructions; for example utilization of C language (instead of MATLAB) on a GPU could accelerate the phase recovery process by a factor of ~20 fold.

While embodiments #1 and embodiment #2 have been described separately it should be understood that in some other embodiments, the aspects of both embodiments may be incorporated with one another. For example, multi-height imaging may be combined with multi-angle imaging. Likewise, the multi-height phase recover approach may be combined with the aperture-based phase recovery. Different approaches may be used depending on the type of sample that is being imaged for example.

While embodiments have been shown and described, various modifications may be made without departing from the scope of the inventive concepts disclosed herein. The invention(s), therefore, should not be limited, except to the following claims, and their equivalents.

What is claimed is:
1. A method for lens-free imaging of a sample or objects within the sample using a sensor comprising:
illuminating the sample containing one or more objects with one or more light sources at a plurality of different illumination angles, wherein at each different angle the one or more light sources, sensor, or sample is shifted in lateral in-plane increments;
obtaining a plurality of images of diffraction patterns of the one or more objects with the sensor, wherein the plurality of images comprise multiple shifted images at each different angle;
generating a plurality of high-resolution pixel super-resolved holograms from the plurality of images, wherein each high-resolution pixel super-resolved hologram corresponds to a different illumination angle;
recovering phase information of the high-resolution pixel super-resolved holograms comprising, for each angle:
a) generating an initial guess of a complex field representing the sample;
b) applying a digital forward-propagation of the resulting field to a sensor plane;
c) updating the amplitude of the field at the sensor plane using a square root of the diffraction patterns generated at each angle, wherein the field amplitude is updated by a weighted average of the forward-propagated amplitude of (b) and the amplitude of the generated pixel super-resolved hologram of the corresponding illumination angle;
d) back propagating the updated field to a sample plane;
e) updating a sub-region of a spatial frequency domain corresponding to each illumination angle using the back propagated field;
f) repeating steps (a) through (e) for each angle; and
outputting a phase-recovered complex field at an object plane based on the recovered lost phase information for one or more angles.
2. The method of claim 1, wherein the one or more light sources comprises a single wavelength.

3. The method of claim 1, wherein the one or more light sources comprises multiple different wavelengths.

4. The method of claim 2, further comprising pseudo-coloring a reconstructed image from the phase-recovered complex field.

5. The method of claim 1, wherein the weighted average of the forward-propagated amplitude and the amplitude of the generated pixel super-resolved hologram of the corresponding illumination angle sum to 100%.

6. The method of claim 1, wherein the sample comprises a tissue sample located on a slide.

7. The method of claim 1, wherein the plurality of illumination angles comprises less than 10 different angles.

8. The method of claim 1, wherein the lens-free imaging has a numerical aperture exceeding 1.0.

9. A system for carrying out the method of claim 1, comprising one or more processors configured to execute instructions thereon for recovering an object image based on a high-resolution synthetic aperture hologram created by the differing illumination angles.

10. The method of claim 1, wherein the sample comprises an unstained pathological tissue sample or a stained pathological tissue sample.

11. The method of claim 1, wherein the sample comprises multi-cellular features, cells, a blood smear, a biological component or constituent, cellular organelle, microscopic or nanoscopic particles, or bacteria.

12. The method of claim 1, wherein the one or more light sources comprise a moveable light source.

13. The method of claim 1, wherein the one or more light sources comprise a least one moveable or stationary light source(s) coupled to one or more waveguide(s), optical fiber(s), or aperture(s) configured to illuminate the sample at different illumination angles.

14. The method of claim 1, wherein the one or more light sources comprise a plurality of light sources configured to illuminate the sample at different illumination angles.

15. The method of claim 1, wherein the one or more light sources comprise a plurality of light sources at different illumination wavelengths configured to illuminate the sample at different illumination angles.

16. The method of claim 1, wherein updating a sub-region of the spatial frequency domain using the back propagated field in (e) comprises a weighted average of the back-propagated amplitude of the field from (d) and the amplitude of the generated pixel super-resolved hologram of the corresponding illumination angle.

17. The method of claim 1, wherein operation (b) further comprises applying a phase modulation and operation (d) removes the phase modulation.

* * * * *